United States Patent
Moran et al.

(10) Patent No.: US 11,620,599 B2
(45) Date of Patent: Apr. 4, 2023

(54) REAL-TIME LABOR TRACKING AND VALIDATION ON A CONSTRUCTION PROJECT USING COMPUTER AIDED DESIGN

(71) Applicant: Armon, Inc., Northbrook, IL (US)

(72) Inventors: Brian K. Moran, Northfield, IL (US); Michael Cassata, Chicago, IL (US)

(73) Assignee: Armon, Inc., Northbrook, IL (US)

( * ) Notice: Subject to any disclaimer, the term of this patent is extended or adjusted under 35 U.S.C. 154(b) by 0 days.

(21) Appl. No.: 17/226,603

(22) Filed: Apr. 9, 2021

(65) Prior Publication Data

US 2021/0319390 A1 Oct. 14, 2021

Related U.S. Application Data

(60) Provisional application No. 63/008,965, filed on Apr. 13, 2020.

(51) Int. Cl.
*G06Q 10/0631* (2023.01)
*G06Q 10/1091* (2023.01)
(Continued)

(52) U.S. Cl.
CPC ..... *G06Q 10/063118* (2013.01); *G06Q 10/04* (2013.01); *G06Q 10/06315* (2013.01);
(Continued)

(58) Field of Classification Search
None
See application file for complete search history.

(56) References Cited

U.S. PATENT DOCUMENTS 5,949,401 A * 9/1999 Kazarian ............... G06F 3/0213
345/163
6,438,535 B1 8/2002 Benjamin et al.
(Continued)

FOREIGN PATENT DOCUMENTS

CA 2327894 A1 * 6/2002
WO 2013059160 A1 4/2013

OTHER PUBLICATIONS

AutoCAD, Wikipedia, archives org, Apr. 3, 2020 https://web.archive.org/web/20200403141336/https://en.wikipedia.org/wiki/AutoCAD (Year: 2020).*

(Continued)

*Primary Examiner* — Octavian Rotaru
(74) *Attorney, Agent, or Firm* — Banner & Witcoff, Ltd.

(57) ABSTRACT

An improved way of managing the labor expended on a construction project, whether a small-scale or large-scale, includes a system, program and method that will use the estimate of labor for a project as an input to the labor management system. The percent complete of the project will be a calculation of installed equipment as opposed to a perceived percent complete of the project. The calculation will be compared to the percent of labor hours used to then determine the state of the construction project. The labor management calculation will be facilitated through a user interface where the user can highlight one or more portions of the virtual project, where the one or more portions represent one or more installed units of the project, such as installed equipment.

8 Claims, 30 Drawing Sheets

(51) Int. Cl.
  *G06Q 50/08* (2012.01)
  *G06Q 10/04* (2023.01)
(52) U.S. Cl.
  CPC . *G06Q 10/063114* (2013.01); *G06Q 10/1091* (2013.01); *G06Q 50/08* (2013.01)

(56) References Cited

U.S. PATENT DOCUMENTS

| | | | |
|---|---|---|---|
| 6,912,489 B1* | 6/2005 | Luitwieler | G06T 17/00 52/93.2 |
| 7,720,703 B1* | 5/2010 | Broughton | G06Q 10/06 705/7.23 |
| 8,033,215 B1* | 10/2011 | Wright | B31F 1/07 101/31 |
| 9,070,216 B2 | 6/2015 | Golparvar-Fard et al. | |
| 9,222,771 B2 | 12/2015 | Rosengaus et al. | |
| 9,424,545 B1 | 8/2016 | Lee | |
| 10,296,665 B2 | 5/2019 | Buzz et al. | |
| 10,331,807 B2 | 6/2019 | Buzz | |
| 2002/0071038 A1* | 6/2002 | Mihelcic | G01B 11/2518 348/207.99 |
| 2002/0073114 A1 | 6/2002 | Nicastro et al. | |
| 2003/0028393 A1 | 2/2003 | Coulston et al. | |
| 2004/0117361 A1 | 6/2004 | Greer et al. | |
| 2004/0181412 A1* | 9/2004 | Menhardt | G10L 13/00 704/E13.008 |
| 2005/0124988 A1* | 6/2005 | Terrill-Grisoni | A61B 17/3403 606/53 |
| 2005/0144893 A1* | 7/2005 | Buzz | G06Q 10/06313 52/741.1 |
| 2005/0166149 A1 | 7/2005 | Frigon et al. | |
| 2006/0085322 A1 | 4/2006 | Crookshanks | |
| 2006/0260377 A1* | 11/2006 | Kane | B21D 5/08 72/307 |
| 2007/0206863 A1 | 9/2007 | Koyama | |
| 2007/0288842 A1 | 12/2007 | Averitt et al. | |
| 2008/0059220 A1 | 3/2008 | Roth et al. | |
| 2008/0109327 A1 | 5/2008 | Mayle et al. | |
| 2008/0195434 A1* | 8/2008 | Broughton | G06Q 10/087 705/7.23 |
| 2008/0262816 A1* | 10/2008 | Lontka | G06F 30/20 703/13 |
| 2010/0077316 A1 | 3/2010 | Omansky et al. | |
| 2011/0043491 A1* | 2/2011 | Oh | G06F 3/0234 345/177 |
| 2011/0307281 A1* | 12/2011 | Creveling | G06Q 10/063 707/790 |
| 2012/0179431 A1* | 7/2012 | Labrie | G06F 30/00 703/1 |
| 2013/0218780 A1* | 8/2013 | Buzz | G06Q 10/06 705/301 |
| 2014/0207774 A1 | 7/2014 | Walter et al. | |
| 2014/0229212 A1 | 8/2014 | MacElheron et al. | |
| 2014/0277666 A1 | 9/2014 | Morkos | |
| 2014/0278281 A1* | 9/2014 | Vaynriber | G06F 30/18 703/1 |
| 2016/0070394 A1* | 3/2016 | Van Ostrand | G06F 3/047 345/173 |
| 2016/0091998 A1* | 3/2016 | Chyan | G06F 3/04883 345/174 |
| 2017/0061336 A1 | 3/2017 | Buzz | |
| 2017/0068933 A1* | 3/2017 | Norton | G06Q 10/06398 |
| 2017/0269691 A1* | 9/2017 | Fleureau | G06F 3/03545 |
| 2017/0348901 A1* | 12/2017 | Hara | B33Y 50/02 |
| 2018/0012125 A1* | 1/2018 | Ladha | G06N 3/045 |
| 2018/0130146 A1* | 5/2018 | AghaKouchak | G06Q 10/06313 |
| 2018/0186571 A1* | 7/2018 | Shimizu | B66F 9/24 |
| 2018/0349522 A1 | 12/2018 | Aphek et al. | |
| 2019/0057354 A1* | 2/2019 | McKenzie | G06Q 50/08 |
| 2019/0205484 A1* | 7/2019 | Morkos | G06Q 10/06313 |
| 2019/0325089 A1* | 10/2019 | Golparvar-Fard | G06T 19/003 |
| 2020/0065971 A1* | 2/2020 | Lorenzo | G06V 20/10 |
| 2020/0151833 A1 | 5/2020 | Bellaish et al. | |
| 2021/0073694 A1* | 3/2021 | Yellin | G06Q 10/06313 |
| 2021/0233186 A1* | 7/2021 | Cohen | G06Q 10/06316 |
| 2022/0036440 A1* | 2/2022 | Jaeger | G06F 16/56 |
| 2022/0084299 A1* | 3/2022 | Han | G06T 19/20 |

OTHER PUBLICATIONS

Digital Production Control, Premium production control software solution [online], On Center Software by ConstructConnect, © 1998-2021 oncenter.com; [retrieved on Oct. 1, 2021], Retrieved from the Internet <URL: https://www.oncenter.com/products/digital-production-control/>.

Jul. 15, 2021—(WO) International Search Report and Written Opinion—App. No. PCT/US21/26884—17 pgs.

Bosché et al. "The value of integrating Scan-to-BIM and Scan-vs-BIM techniques for construction monitoring using laser scanning and BIM: The case of cylindrical MEP components" Automation in Construction, journal homepage: www.elsevier.com/locate/autocon, May 25, 2014, 13 pages.

Golparvar-Fard et al. "Visualization of Construction Progress Monitoring with 4D Simulation Model Overlaid on Time-Lapsed Photographs" Journal of Computing in Civil Engineering © ASCE, Nov./Dec. 2009, 15 pages.

* cited by examiner

| Project Management Dashboard x | | | | | | | |
|---|---|---|---|---|---|---|---|
| Labor Tracking | Change Order Request Log | | | | | | |

Labor Tracking - Project Manager

Job Number: 123456789  Job Title: Test Job

Latest Labor Entries Recorded: 2021-02-05

Labor Type: LVF

Budget Type: Original Estimate

Export Labor Entry Report to PDF

| Cost Code Number | Labor Tracking Entry | Floor | Cost Code Description | Labor Type | Labor Completion of Task | Date of Update | Hours Used | Estimated Hours |
|---|---|---|---|---|---|---|---|---|
| 400143 | L43a | | Duct-Low Pressure-L43a | LVF | 40.0% | 2021-02-05 | 40 | 40 |
| 400144 | L44a | | Duct-Low Pressure-L44a | LVF | 60.0% | 2021-02-05 | 152 | 148 |
| 400145 | L45a | | Duct-Low Pressure-L45a | LVF | 30.0% | 2021-02-05 | 120 | 148 |
| 400146 | L46a | | Duct-Low Pressure-L46a | LVF | 30.0% | 2021-02-05 | 119 | 138 |
| 400147 | L47a | | Duct-Low Pressure-L47a | LVF | 30.0% | 2021-02-05 | 128 | 138 |
| 400148 | L48a | | Duct-Low Pressure-L48a | LVF | 30.0% | 2021-02-05 | 121 | 138 |
| 400150 | L50a | | Duct-Low Pressure-L50a | LVF | 7.0% | 2021-02-05 | 88 | 118 |
| 400151 | L51a | | Duct-Low Pressure-L51a | LVF | 7.0% | 2021-02-05 | 56 | 118 |
| 400152 | L52a | | Duct-Low Pressure-L52a | LVF | 100.0% | 2021-02-05 | 32 | 48 |
| 400336 | L36c | | Duct-Low Pressure-L36c | LVF | 90.0% | 2021-02-05 | 48 | 48 |
| 400337 | L37c | | Duct-Low Pressure-L37c | LVF | 35.0% | 2021-02-05 | 48 | 48 |
| 400338 | L38c | | Duct-Low Pressure-L38c | LVF | 20.0% | 2021-02-05 | 56 | 48 |
| 400339 | L39c | | Duct-Low Pressure-L39c | LVF | 88.0% | 2021-02-05 | 52 | 32 |
| 400822 | LL2b | | Duct-Low Pressure-LL2b | LVF | | | | |

Cost Code Entry
Labor Track Entry
Labor Floor Report
Man Power Job
Total Project Hours
Total Project Cost
Plan At Complete
Options

| Floor | Cost Code | Cost Code Description | Labor Type | Estimated Hours | Hours Used FEM | Completion % of Task | % Floor Hours Used | Date of Update |
|---|---|---|---|---|---|---|---|---|
| COR | 447999 | Whole Foods Drain Pans-COR | LVF | 275.00 | 305.00 | 90.00% | 110.91% | 2020-10-30 |
| | | Subtotals | | 275.00 | 305.00 | % Floor Completion 90.00% | 110.91% | |
| Gen | 0 | | LVF | 0.00 | 0.00 | 100.00% | 100.00% | Not Charged |
| | 451000 | Hoisting-Equipment-GEN | LVF | 326.00 | 152.00 | 95.00% | 46.63% | 2020-10-23 |
| | 455000 | Hoisting-Equipment-GEN | LVF | 100.00 | 1,057.00 | 97.00% | 1057.00% | 2021-02-05 |
| | 460000 | Temp Heat/Cooling-GEN | LVF | 120.00 | 76.00 | 60.00% | 63.33% | 2020-09-18 |
| | 464000 | Mobilize/Demobilize-GEN | LVF | 200.00 | 212.00 | 94.00% | 106.00% | 2021-02-05 |
| | 468000 | Safety-GEN | LVF | 500.00 | 147.00 | 13.00% | 29.40% | 2021-01-29 |
| | 480000 | Foreman Supervision-GEN | LVF | 217.50 | 217.50 | 100.00% | 100.00% | 2020-08-28 |

Project Tracking Dashboard
Labor Tracking | Change Order Request Log

Labor Tracking - Project Manager

| Job Number | Job Title |
|---|---|
| 123456789 | Test Job |

Latest Labor Entries Recorded: 2019-11-22

Budget Type: Forecast At Complete ▼ — 366
Original Budget
Forecast At Complete — 367

Labor Tracking Report - Total Cost    Labor Type: All ▼    Labor Type: All

Export Project Report to PDF

| | |
|---|---|
| Total Cost Used | $610,075.04 |
| Total Cost Forecast | $618,790.28 — 369 |
| Percent Cost Used | 98.59% |
| Hourly Rate Actual | $76.19 |
| Hourly Rate Budgeted | $75.95 |

Percent Building Complete: 85.43%    Delta Percent: -13.16%

Cost Code Entry
Labor Track Entry
Labor Floor Report
Man Power Job
Total Project Hours
Total Project Cost
Plan At Complete Options
— 480

Monday, December 2, 2019    Week Ending 2019-11-22    Job ID 123456789    Test Job

| Project Tracking Dashboard | | |
|---|---|---|
| Labor Tracking | Change Order Request Log | |

Labor Tracking - Project Manager

| Job Number | Job Title | | Labor Type | Latest Labor Entries Recorded | Budget Type |
|---|---|---|---|---|---|
| 109320000 | ROSALIND FRANKLIN UNIVERSITY | All | ALL | 2019-12-13 | Forecast At Complete |

Export Cost Code Entries to PDF

| Cost Codes | Cost Code Description | Forecast At Comp | Floor Number | Labor Type | Man Power | Start Date |
|---|---|---|---|---|---|---|
| 400001 | Duct-Low Pressure-L1 | 468 | L01 | LVF | 0 | |
| 400002 | Duct-Low Pressure-L2 | 612 | L02 | LVF | 0 | |
| 400003 | Duct-Low Pressure-L3 | 652 | L03 | LVF | 0 | |
| 400004 | Duct-Low Pressure-L4 | 532 | L04 | LVF | 0 | |
| 401001 | Duct-M/P-L1 | 380 | L01 | LVF | 0 | |
| 401002 | Duct-M/P-L2 | 540 | L02 | LVF | 0 | |
| 401003 | Duct-M/P-L3 | 516 | L03 | LVF | 0 | |
| 401004 | Duct-M/P-L4 | 420 | L04 | LVF | 0 | |
| 401915 | Duct-M/P-RF | 288 | RF | LVF | 0 | |
| 402001 | Duct-Wall Xfers-L1 | 15 | L01 | LVF | 0 | |
| 402002 | Duct-Wall Xfers-L2 | 12 | L02 | LVF | 0 | |
| 402003 | Duct-Wall Xfers-L3 | 2 | L03 | LVF | 0 | |
| 402004 | Duct-Wall Xfers-L4 | 2 | L04 | LVF | 0 | |
| 411001 | Duct-Stainless Steel-L1 | 64 | L01 | LVF | 0 | |
| 411002 | Duct-Stainless Steel-L2 | 54 | L02 | LVF | 0 | |

Options:
- Cost Code Entry
- Labor Track Entry
- Labor Floor Report
- Man Power Job
- Total Project Hours
- Total Project Cost
- Plan At Complete ≡ Job Tracking  ✱SETTINGS▾ | ◉ SYSTEM ADMIN▾

Jobs

Filters

| Job Number | Job Name | Customer | | Status |
|---|---|---|---|---|
| 642 | 644 | 646 648 | 650 652 | 654 Active |

Showing 1 to 6 of 6 entries  25 ▸

| | Job Number | Job Name | Customer | Labor Types | Job Site | City | State | Zip Code | Status |
|---|---|---|---|---|---|---|---|---|---|
| ☐ | 12222 | Goofy | Bluestone Corporation | LPS | 100 Main St | Chicago | IL | 60606 | Active |
| ☐ | 123456789 | Fox | Bluestone Corporation | LFS, LPE | 3420 N Mahtred St | Chicago | IL | 60615 | Active |
| ☐ | 659876213 | Eagle | Bluestone Corporation | LFS | 555 W Corneta Ave | Chicago | IL | 60657 | Active |
| ☐ | 781267837 | Hornet | Bluestone Corporation | LFS | 555 S Wacker Dr | Chicago | IL | 60657 | Active |
| ☐ | 824569322 | Rex | Bluestone Corporation | LFS | 9676 Divery Ave | Elgin | IL | 60120 | Active |
| ☐ | 937654321 | Bear | Bluestone Corporation | LPE | 658 Rodeo Dr | Aurora | IL | 60568 | Active |

First Previous [1] Next Last

PROD 1.0

660 — Job Details: Rex

664 — Overview

662 — Job Number
894569322

Customer
Bluestone Corporation  676

Job Site
Street Address
9876 Diversy Ave

SAVE | SAVE AND EXIT | CANCEL

670 — Job Name
Rex

Project/Manger (Lead)
Michael,Scott  678

City
Elgin

672 — Status
Active

Additional Project Manager(s)
Additional,Project Manager(s)  678

State
Illinois

674 — Labor Types
× LFS

Zip Code  680
60120

Drawings

Showing 1 to 6 of 6 entries  25

| | Drawing Name | Date/Time Processed 690 | Status 692 |
|---|---|---|---|
| □ | Floor Plan 1 | | Ready for Mobile App |
| □ | Floor Plan 10 | 02/15/2021 12:50 pm | Extracted |
| □ | Floor Plan 11 | | Pending Extract |
| □ | Floor Plan 3 | | Pending Extract |

682

SETTINGS ▾ | SYSTEM ADMIN ▾

PROD 1.0

FIG. 21

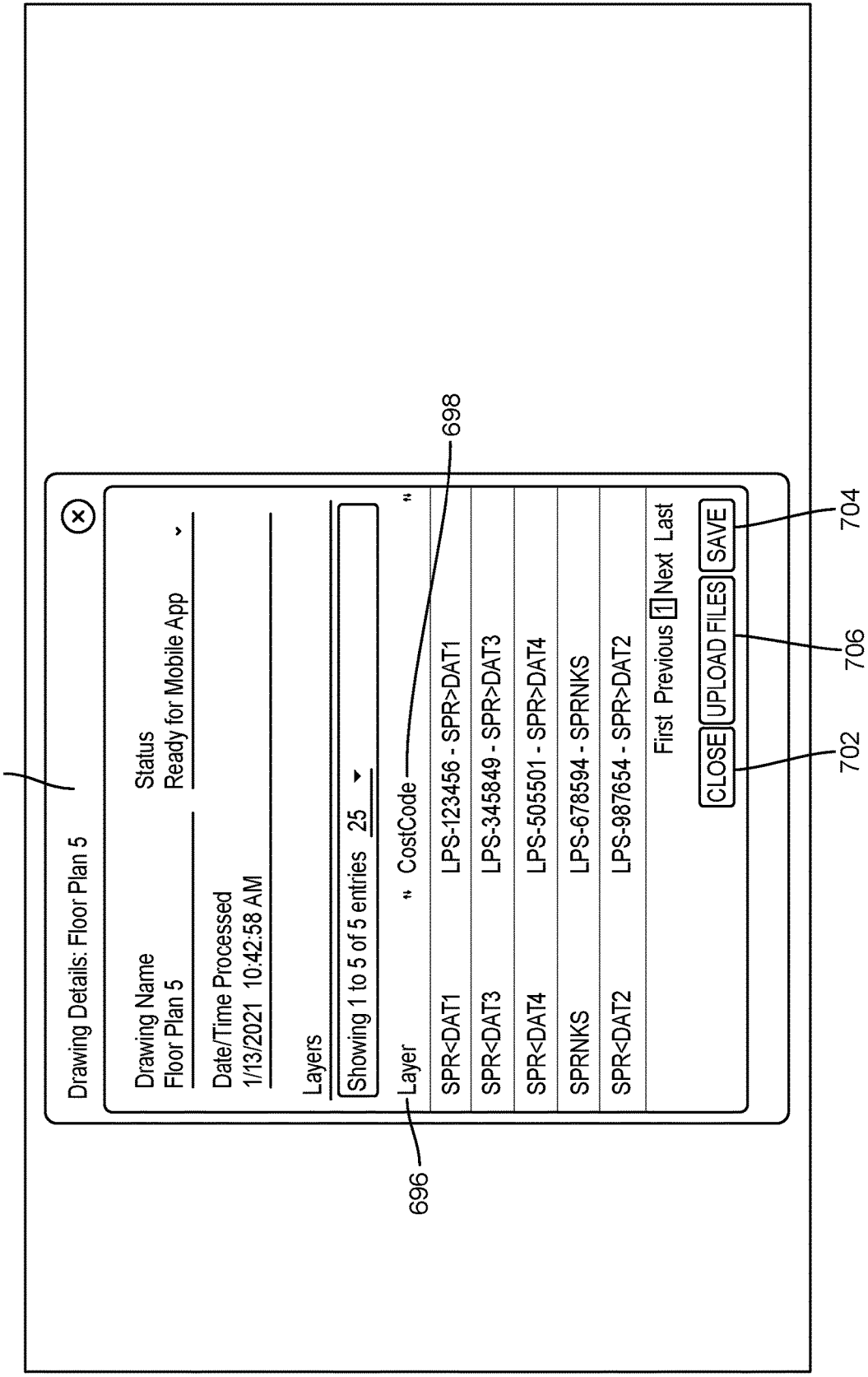

860

894569322 | Rex  •Active
Job Site: 9876 Diversy Ave | Elgin, IL 60120

◄  Floor Plan 1  💾 ⊗ —866

Cost Code LPS-123456-SPRKDAT1

861— Installation Summary

| Cost Code | Selected | Units Installed Previous | Subtotal | Drawing Units Total | Percent Units Installed |
|---|---|---|---|---|---|
| LPS-123456 | 272.000 | 272.000 | 544.000 | 2336.899 | 23.28% |
| LPS-345849 |  | 0 | 0 | 1965.410 | 0.00% |

—863

Selected Components

864— Component     Installed —862

Line - 108.63 Feet     ⊘

Line - 17.38 Feet     ⊘

FIG. 29

REAL-TIME LABOR TRACKING AND VALIDATION ON A CONSTRUCTION PROJECT USING COMPUTER AIDED DESIGN

CROSS-REFERENCE TO RELATED APPLICATION

This application is a non-provisional application of and claims benefit to U.S. Provisional Application No. 63/008,965 filed Apr. 13, 2020, which is incorporated herein by reference in its entirety.

FIELD OF THE INVENTION

The present invention relates generally to systems and methods for tracking labor for a construction project.

BACKGROUND OF THE INVENTION

It is known that construction projects are complex, high risk and very expensive endeavors. Construction contractors who perform work on a "lump-sum" basis are at high risk because they are bound to their own estimates. When improperly estimated or managed, construction projects whose actual hours exceed estimated hours expose the company to financial loss with few, if any, ways to recoup those losses.

The largest financial component of estimates is the labor costs associated with installing equipment/systems in the field. There is no accurate means to measure progress in the field against the estimated/desired outcomes. Current ways of tracking labor are highly subjective and not very objective and therefore oftentimes are inaccurate.

A known, and typically inaccurate, way of estimating how a project is performing in the field is by calculating the percent complete of the project. This percent complete estimate is calculated by dividing the actual labor hours used-to-date by the total estimated labor hours (provided the original estimated hours is accurate). Another known, and typically inaccurate, way of estimating how a project is performing involves estimating the percent complete of a given task and comparing that estimate to the percent of hours used-to-date for that task. Yet another inaccurate way of estimating how a project is performing involves estimating how many labor hours remain to be used, adding those hours to actual hours used-to-date, and then comparing this total to the total estimated hours for the project.

All of these known methods of determining how a construction project is performing suffer from numerous drawbacks. As stated, these methods are highly subjective and oftentimes inaccurate. Moreover, the input variables, such as the estimated labor hours, if incorrect, will create further inaccuracies as to the status of the actual project. Additionally, the known methods are a reactive process since they only assess where the project will likely end up. In situations where the actual hours end up being much higher than the estimated number of hours, the time this is discovered is often too late to allow one to take corrective action. As an example, realization that actual hours will exceed estimated hours usually occurs when the project is well past 50% complete and up to 80% complete. By that time, there is very little the contractor can do to remedy the outcome.

Numerous other factors also exist that can adversely affect the performance of the project, including project scope changes, weather, stacking of trades, coordination problems, architectural plan mistakes or discrepancies, crew mixes, field leadership issues, and so on.

These and other known problems with existing methods of tracking the progress of construction projects are overcome by the disclosures and teachings of the present invention.

BRIEF SUMMARY OF THE INVENTION

Below is a brief summary of the various aspects and embodiments of the invention. The brief summary is not intended to be an extensive overview, nor to identify key or critical elements. The summary merely presents the inventive concepts in a simplified form and as an introduction to the more detailed description provided below.

Various aspects of the disclosure of the invention provide for a more accurate, efficient, effective, useful, and convenient way of managing the labor expended on a construction project, whether a small-scale or large-scale project. In particular, in one or more embodiments discussed in greater detail below, the system, program and methods described herein will use the estimate of labor for a project as an input to the labor management system. With the exception of non-equipment and non-material based tasks, such as meetings, supervision, etc., the percent complete of the project will be a calculation of installed equipment as opposed to a perceived percent complete of the project.

To accomplish the goals of the invention, a mobile device, such as a smartphone or tablet, or a desktop computer may be used and may display a virtual image of the layout of the project that a user may select one or more portions (i.e., equipment) of the project. The labor management calculation will be facilitated through a user interface where the user can highlight one or more portions of the virtual project, where the one or more portions represent one or more installed aspects of the project, such as installed equipment. This calculation will be compared to the percent of labor hours used to then determine the state of the construction project.

In one aspect, one or more graphs may be provided that plot out the difference in percent complete versus the percent of estimated labor used. These graphs will then be used to project the trend of the project. If it is determined that a project is trending towards exceeding the original estimate, adjustments to manpower, for example, can be made in real-time to get the project back on track. With the embodiments and aspects of the invention described herein, labor tracking is done proactively as opposed to reactively which is a problem with known project tracking methods.

In another aspect, the system, program and methods described herein will provide a means to determine, with a high degree of accuracy, where actual field labor hours and associated work complete compare with estimated labor hours for that same volume of work. The program effectively reports to the project management team whether the field labor hours are tracking with the estimate. It also serves as a predictor of where the project will finish relative to the estimate. It does this by calculating the expected (forecasted) hours at completion based on units installed:

$$\text{Forecasted Hours} = \frac{\text{Hours Used}}{\left\lceil \frac{\text{Units Installed}}{\text{Units Estimated}} \right\rceil}$$

By doing this calculation, the problem it solves is identifying adverse job conditions and correlating them to productivity loss early enough so that corrective action can be taken. And when corrective action is taken early enough, work plans can be changed, crew sizes modified, foreman changed, requests for information and change order requests can be submitted, and so on.

In another aspect, the system, program and methods described herein provide a tool that determines how many labor hours it should have taken to install portions of the equipment and/or systems. This tool links a company's labor estimating productivity factors with actual work installed to deliver a precise measure of how many hours the installation should have taken. Compared with the actual field labor hours used, management can accurately assess whether the project is on track or off track at any point in time.

BRIEF DESCRIPTION OF THE DRAWINGS

A more complete understanding of the exemplary embodiments of the present invention and the advantages thereof may be acquired by referring to the following description in consideration of the accompanying figures, in which like reference numbers in the figures indicate the same or similar features and wherein:

FIG. 9 depicts another illustration of exemplary aspects of the disclosed labor management system.

FIG. 10 depicts another illustration of exemplary aspects of the disclosed labor management system.

FIG. 16 depicts another illustration of exemplary aspects of the disclosed labor management system.

FIG. 17 depicts another illustration of exemplary aspects of the disclosed labor management system.

FIG. 20 depicts another illustration of exemplary aspects of the disclosed labor management system.

FIG. 21 depicts another illustration of exemplary aspects of the disclosed labor management system.

FIG. 22 depicts another illustration of exemplary aspects of the disclosed labor management system.

FIG. 29 depicts another illustration of exemplary aspects of the disclosed labor management system.

Figure 1:
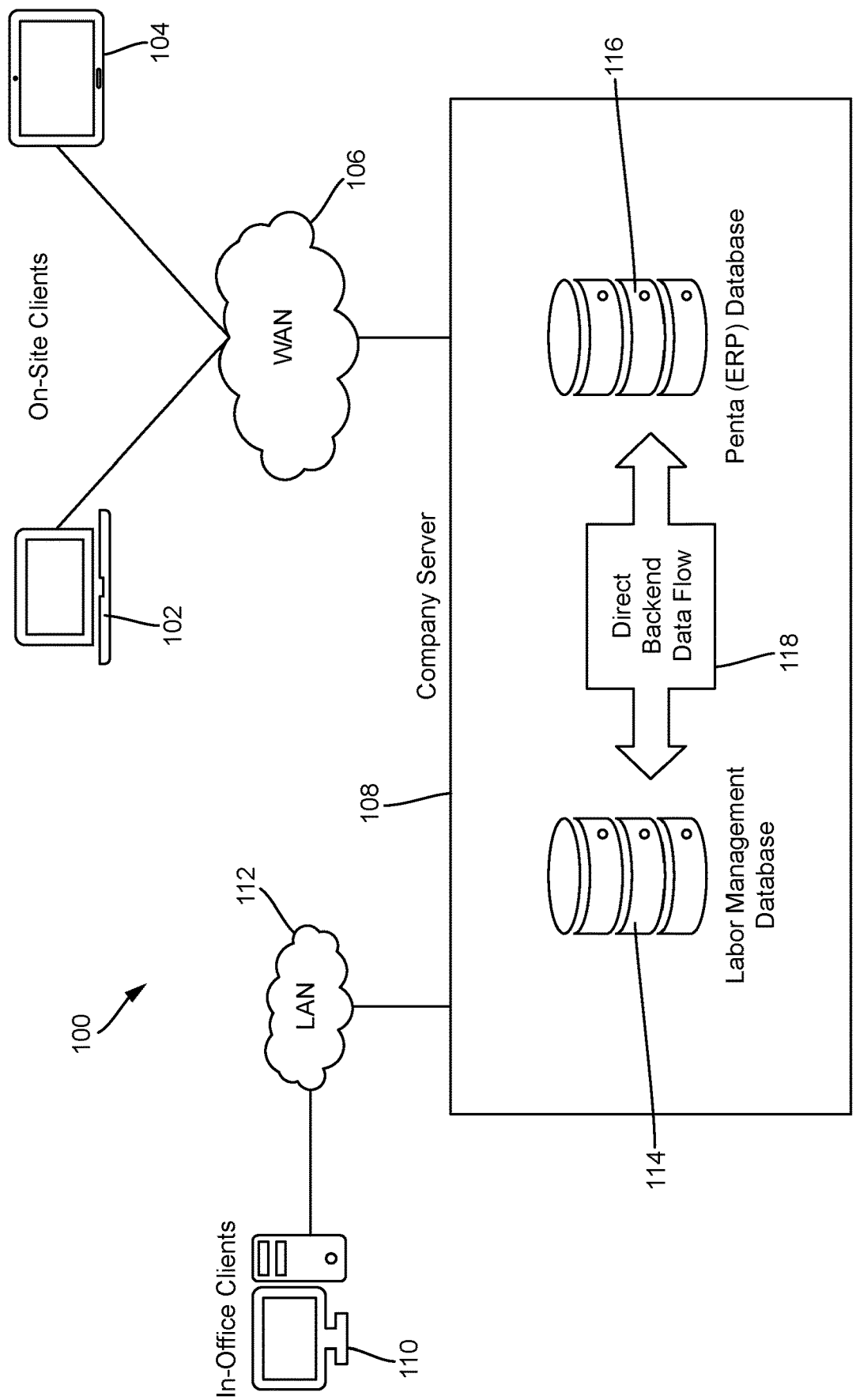
FIG. 1 depicts a network diagram that may be used to implement one or more illustrative aspects of the invention described herein.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting.

DESCRIPTION OF THE EMBODIMENTS OF THE INVENTION

In the following description of the various embodiments, reference is made to the accompanying drawings, which form a part of the application, and in which is shown by way of illustration various embodiments and aspects of the labor management system. It should be understood that other embodiments and aspects may be utilized with the teachings of this disclosure without departing from the scope of embodiments and aspects discussed herein. The labor management system is capable of other embodiments and of being practiced or carried out in various alternative ways.

In the following description of the various embodiments, a person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

It should also be understood that the phraseology and terminology used herein are for the purpose of description and should not be regarded as limiting. Rather, the phrases and terms used herein are to be given their broadest interpretation and meaning. The use of "including," "comprising" and "defining," and variations thereof are meant to encompass the items listed thereafter and equivalents thereof as well as additional items and equivalents thereof.

Aspects and embodiments described herein provide companies with the ability to analyze the state of a construction or building project and the numerous tasks associated with the project in real-time to determine the amount of labor hours expended on the project versus the estimated labor hours. Aspects described herein also permit access to and manipulation of the real-time data to convert the data into a usable format.

The labor management system may include applications and programs in the form of non-transitory computer-readable storage media having computer-readable program code that execute on a computing device, such as a desktop computer, portable computer or tablet. It may also execute through a mobile device and an application on the mobile device, and may respond to touch input via a touchscreen of the mobile device. All of these devices may be configured to receive information from one or more databases storing construction project data, drawing data, metadata from drawings, cost codes, or other pertinent construction information. In some embodiments, the labor management system may retrieve project data or information in response to user input. In other embodiments, a server communicatively coupled with the one or more of the databases may periodically retrieve and push project data or information to the user.

In other aspects and embodiments, the analysis of the project labor data and data and information entered remotely from a project location, may be performed by one or more servers described herein that is associated with or coupled to one or more databases. In other embodiments, the analysis of the labor data may be performed locally by the devices described above that execute the labor management system application.

In yet further aspects and embodiments, the labor management system may be specific to a particular construction project, or it may be general to any project management data that requires numerous tasks. In other words, the teachings of the disclosed embodiments are not limited to labor tracking management or to a particular type of construction project. Rather, the labor management system of the invention has broad application and may be used for any type of managed project and to provide access to other types of project management data to facilitate the execution and completion of the project in a highly coordinated, real-time manner.

In one embodiment of the invention, the labor management system described herein may be used for, but is not limited to, tracking labor productivity for a contractor or subcontractor for a particular project. In one aspect, the program of the labor management system may receive user input regarding the estimated labor hours for one or more tasks, or all tasks, of a project. The user may also input the various components, equipment, systems, etc. to be installed at a project location (herein referred to as "units"). For example, this may include the amount of feet of pipe or HVAC material needed, or the number of sprinkler heads, and so forth. The user may also input a start date for the task. The labor management system will then tabulate and use these inputs to create an initial labor tracking schedule.

In one aspect, the output of the labor tracking schedule may include one or more cost codes which are associated with tasks for a given floor/area of a building, for example. In an exemplary aspect, the tasks or groups of tasks are assigned a cost code. The cost code may have an estimate of hours, cost, and units to complete the task(s). As explained in further detail below, the cost codes are what the workers charge against, thereby connecting the estimate to the production costs. The labor tracking schedule may also provide an estimate of the field hours needed, an hourly rate for each worker, and the quantity of material and/or equipment needed for the particular task. In one embodiment, the cost codes are loaded and maintained in a database that may be accessed through a SQL server. The cost codes may be accessed via an ERP program and database (Enterprise Resource Planning software), such as Penta, which is a construction resource planning program. Other types of resource planning software and SQL server databases may be used with the labor management system described herein.

The labor management system may use its own database and server and it may be connected directly to another ERP program and database, such as a financial ERP program, through an application program interface (API) between the databases and servers. In this configuration, information loaded into the other ERP system will be visible and accessible in the labor management system program, reducing rekeying of information into another program. The labor management system will communicate with the ERP system and vice versa.

The labor management system may include front end user interfaces that will allow users to access the data inputted and stored in the system, enter tracking information relating to the progress of the project, and generate and review various reports. In one embodiment, the user interface may programmatically change depending on the user's role. For example, depending on whether the user is an executive, project manager or foreman will dictate the types of reports that this person may receive or the data that he or she may access. In an alternative aspect, the users may further be segregated into security groups via an active directory feature. In this situation, the data may be filtered through security protocols depending on the division of the company the user works for and the user's role.

In another aspect of the embodiments, to identify and track the installed material for a project, the labor management system may integrate one or more drawings that are used at a project location to build the job. The drawings may be loaded and accessed in the form of a virtual shop drawing in the program that is loaded on a mobile laptop or device, for example, where the user can simply highlight the installed units by using one's finger, a computer mouse, cursor, stylus or some other indicating tool. The selected information identified on the virtual drawing indicates that the units have been installed. This updated information and the metadata associate therewith in the labor management system will then be used to calculate the total percent complete of the project and/or the percent complete of each unit or task, as described herein. Other techniques may be used to input the fact that the unit has been installed, such as through QR code scanning, laser scanning, vision recognition or photographing and uploading of images of the installed unit. Once a user inputs the update to the particular unit or task, the labor management system may transmit the updated data and information to a dedicated or distributed database for storing and updating of the project schedule. Users may access the updated information to review the status of the project.

Referring to the Figures, which provide illustrations of various aspects of the labor management system of the invention, FIG. 1 illustrates one example of a network diagram that may be used to implement one or more exemplary aspects of the invention described herein. The labor management system 100 may include one or more on-site clients 102, 104, such as a computing device, namely, a desktop computer, portable computer, tablet or mobile device that may be interconnected via a wide area network (WAN) 106, such as the Internet, to the company server and databases 108. Other networks may also or alternatively be used, including private intranets, corporate networks, local area networks, wireless networks, personal networks, "cloud" computing networks, and the like. A WAN is shown for illustration purposes and may be replaced with fewer or additional computer networks, described above, to connect an on-site client to the company server and databases. The labor management system may also include one or more in-office clients 110, such as a computing device, namely, a desktop computer, portable computer, tablet or mobile device, that may be interconnected via a local area network (LAN) 112 to the company server and databases 108. The LAN may use one or more of a variety of known different protocols to connect the in-office clients to the company server and databases 108.

In one exemplary embodiment, the company server and databases may include one or more labor management databases 114 and one or more ERP databases 116 all of which are interconnected at the backend 118. This interconnectivity permits the direct data flow between the various databases.

In one embodiment, the on-site and in-office clients may include a mobile device, such as, a laptop, smartphone, tablet, and the like, or it may include a desktop computer. These devices may include a variety of components, for example, a visual display (a touchscreen or other display screen) to present data or information to the user, a user input (a touchscreen, physical buttons, keyboard, mouse, a stylus, or the like) to receive input from a user, a camera to take photographs, pictures, or images of physical objects, and a wireless communication component (a cellular transceiver, a Wi-Fi transceiver, etc.) to communicate with the company's server and databases. It should be understood that the servers and databases may be provided on separate physical equipment, or may be combined on the same physical equipment and yet retain separate functionality.

In one exemplary aspect, the labor management system 100 of the invention may be implemented using the network described in FIG. 1. For example, the labor management system may be implemented via one or more of data servers, one or more of databases, one or more of the on-site and in-house clients, and the one or more WAN and LAN networks.

In an exemplary embodiment, the labor management system may be embodied in computer-usable or readable data and/or computer-executable instructions, such as in one or more program modules, executed by one or more on-site or in-house computers or other devices as described herein. In a general aspect, program modules may include routines, programs, objects, components, and data structures that perform particular tasks or implement particular abstract data types when executed by a processor in a computer or other device. The modules may be written in a source code programming language that is subsequently compiled for execution, or may be written in another language. The computer executable instructions may be stored on a computer readable medium such as a hard disk, removable storage media, solid state memory, etc. It should be understood that the functionality of the program modules may be combined or distributed as desired in various embodiments. In addition, the functionality may be embodied in whole or in part in firmware or hardware equivalents.

Figure 2:
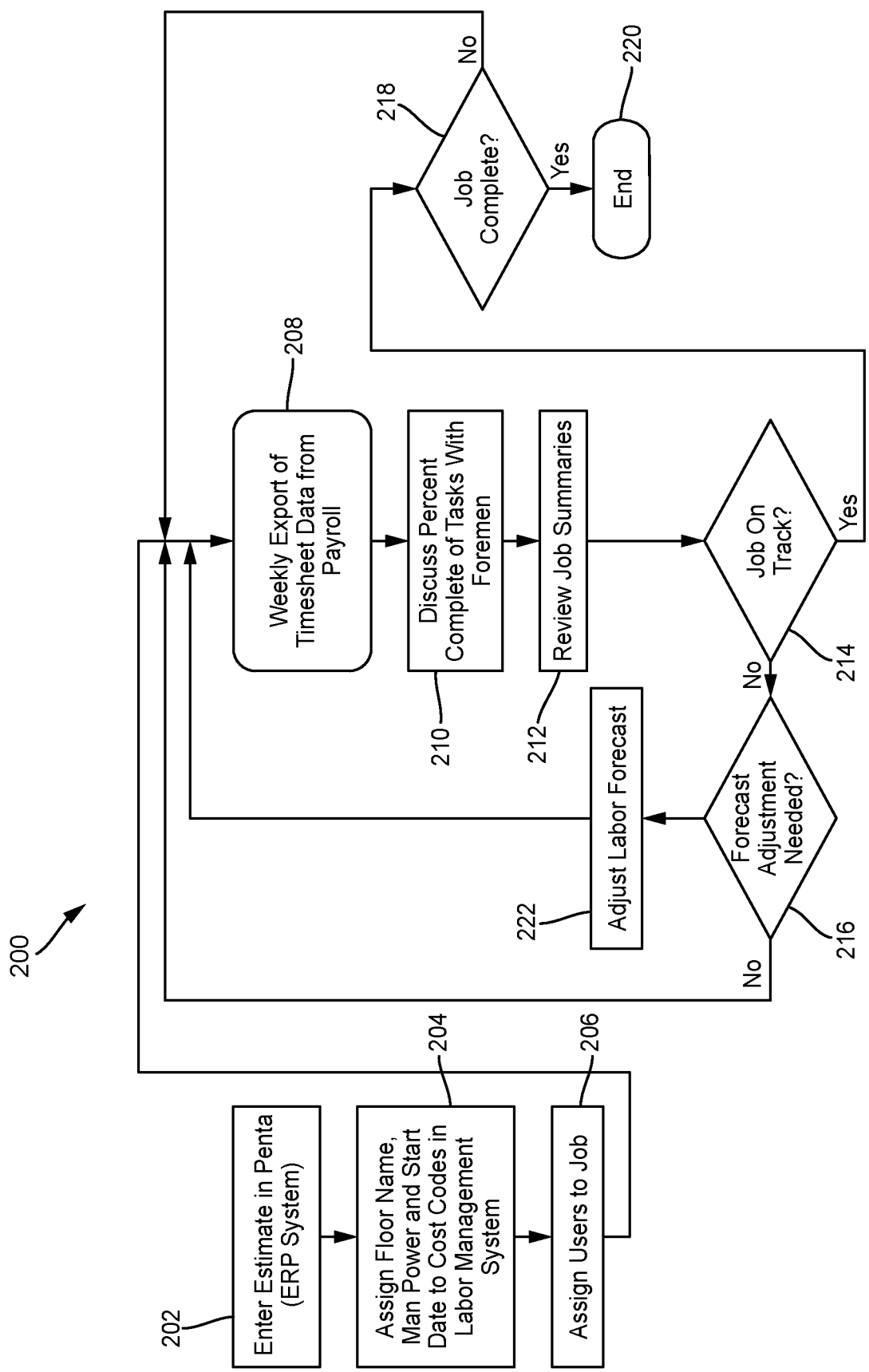
FIG. 2 depicts an exemplary flowchart of one or more illustrative aspects of the invention described herein.

FIG. 2 depicts a flowchart for the workflow an exemplary method 200 of using the labor management system 100. In one or more embodiments, the methods disclosed herein, including the method of FIG. 2 and the one or more steps disclosed in FIG. 2, may be performed by a computing device (e.g., desktop computer, laptop computer, tablet, smartphone, mobile device, etc.), in other embodiments the method may be embodied in computer-executable instructions that are stored in a computer-readable medium, such as a non-transitory computer readable memory. In one or more embodiments, the method of FIG. 2 and the one or more steps disclosed in FIG. 2 may be performed in the order shown in FIG. 2 or may be performed in a different order. In some instances, one or more of the steps of FIG. 2 may be omitted or skipped.

Referring to FIG. 2, the exemplary method 200 may begin at step 202 where a user inputs the project estimate. In one embodiment, the project estimate may be entered into the ERP database. The estimate information may include the estimated total costs to complete the project, or it may include the estimated costs to complete certain tasks within the overall project. Cost codes associated with particular tasks may be retrieved from the ERP database and assigned to the project. The individual cost codes and the costs associated with those codes will make up the total costs of the project. Additional project identifiers and additional project information may also be entered at this step.

In step 204, a user may assign to each particular cost code certain additional information, such as the floor name, the man power needed to complete the particular task, and the start date for the task. This information is entered into and stored by the labor management system database. The user may also sequence the order in which the tasks are to be completed. Additional task information and parameters may also be inputted at this step.

In step 206, a user may assign certain personnel to the project. For example, the user may assign an executive, project manager or foreman to the project. These personnel may be identified by name or by an employee ID code. These personnel will have access to and in some situations, based on their authorization, the ability to modify or adjust the tasks or estimate for the project. They will also have the ability to access the real-time data to generate reports showing the status of the projects.

In step 208, weekly timesheet data is exported from a payroll data base. The timesheet data may include information about an employee working on a project and the number of hours he or she worked on the project or a particular task of the project. The timesheet data, including hours assigned against or charged to cost codes and possibly units installed, is correlated and compared with the cost code's estimated hours and estimated units to determine the state of the tasks and the project as a whole.

In step 210, the timesheet data and hours completed on a particular task of the project is reviewed by a project manager or other person responsible for the project. This information may also be discussed with the project foreman. In one aspect of the embodiments, the labor management system calculates the percentage of the task completed and provides the percentage to the user, for example, the project manager.

In step 212, the project manager or other person responsible for the project reviews the percentage of the completed task and compares the information with the project tasks to determine whether the project is within the estimate or not.

In step 214, a decision is made by the project manager whether the project is within the estimate and if it is not, at step 216, the project manager determines whether an adjustment needs to be made to the project forecast.

The project manager will then determine, at step 218, whether the project is complete. If the project is complete, then the project is ended at step 220.

If the project is not yet complete, then the step of reviewing the weekly timesheet data, at step 208, is repeated. The process of tracking the remainder of the project is repeated until the project is completed and ended, at step 220.

If the project is not within the estimate, at step 216, the project manager determines whether or not the project forecast needs to be adjusted. If no adjustments to the forecasts are needed, then the step of reviewing the weekly timesheet data, at step 208, is repeated, and the process of tracking the remainder of the project is repeated until the project is completed and ended, at step 220.

If adjustments to the forecasts are needed, then in step 222 the project manager will reforecast the amount of labor needed to complete the project. The project manager makes this adjustment by updating the labor management system and/or the ERP system with the labor hours needed to complete the project. After the updates are inputted, and the new forecast created, then the step of reviewing the weekly timesheet data, at step 208, is repeated, as described herein. The process of tracking the remainder of the project is repeated until the project is completed and ended, at step 220.

Figure 3:
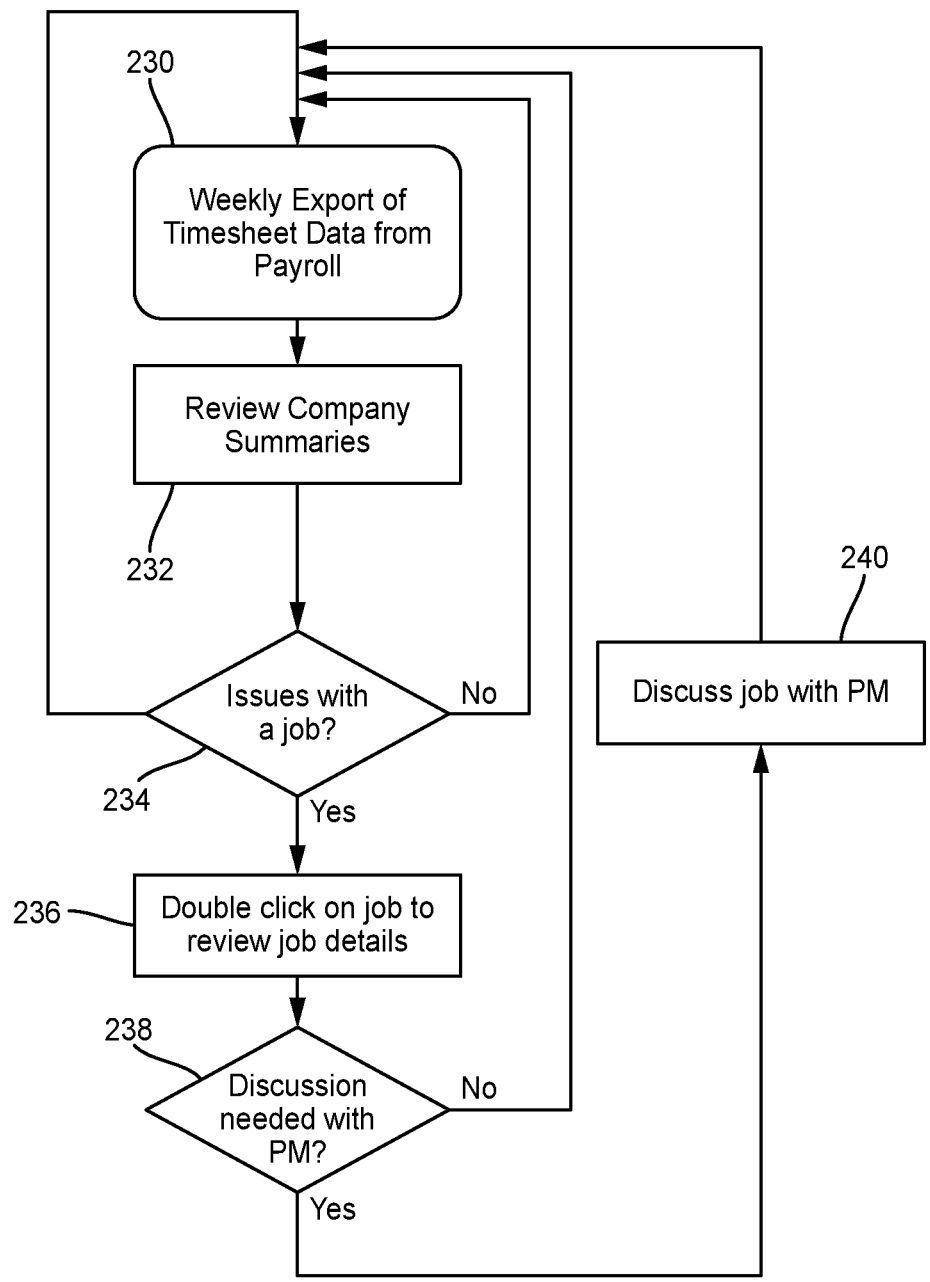
FIG. 3 depicts another exemplary flowchart of one or more illustrative aspects of the invention described herein.

Referring to FIG. 3, a flowchart illustrating the workflow of an alternative exemplary method of using the labor management system is shown. The exemplary method of FIG. 3 reflects how an executive may track the progress of the project through the labor management system.

In step 230, the weekly timesheet data is exported from a payroll data base. As stated, the timesheet data may include information about an employee working on a project and the number of hours worked on the project, the number of units installed, or a particular task of the project, by the employee. The timesheet data is correlated and compared with the number of hours assigned to the cost codes which were charged against. Also in step 230, the timesheet data and hours charged to a particular project, or task of the project, or multiple projects and/or tasks, are reviewed by a company executive. The labor management system calculates and provides the percentage of the project and/or tasks completed for one or more projects and provides the percentages to the executive.

In step 232, the executive reviews the percentage of the completed project or completed task within the project and compares the information with the overall project estimate and timeline to determine whether the one or more projects are within the estimate or not.

In step 234, a decision is made by the executive whether the one or more projects are within the estimate. If not within the estimate, and if there are issues with the project, in step 236, the executive more carefully reviews the details of the project to determine what are the problems or issues with the project.

If the one or more projects are within the estimate, then the step of reviewing the weekly timesheet data, in step 230, is repeated. The process of tracking the remainder of the one or more projects is repeated until the project is completed.

If the one or more projects are not within the estimate, as determined at step 236, the executive reviews the details of the project and determines, in step 238, whether or not to discuss the project status with the project manager. If no discussions with the project manager are needed, then the step of reviewing the weekly timesheet data, at step 230, is repeated, and the process of tracking the remainder of the one or more projects is repeated until the project is completed.

If discussions are needed with the project manager, then in step 240 the executive will review the one or more projects with the project manager. After which, the step of reviewing the weekly timesheet data, at step 230, is repeated, and the process of tracking the remainder of the one or more projects is repeated until the project is completed.

Figure 4:
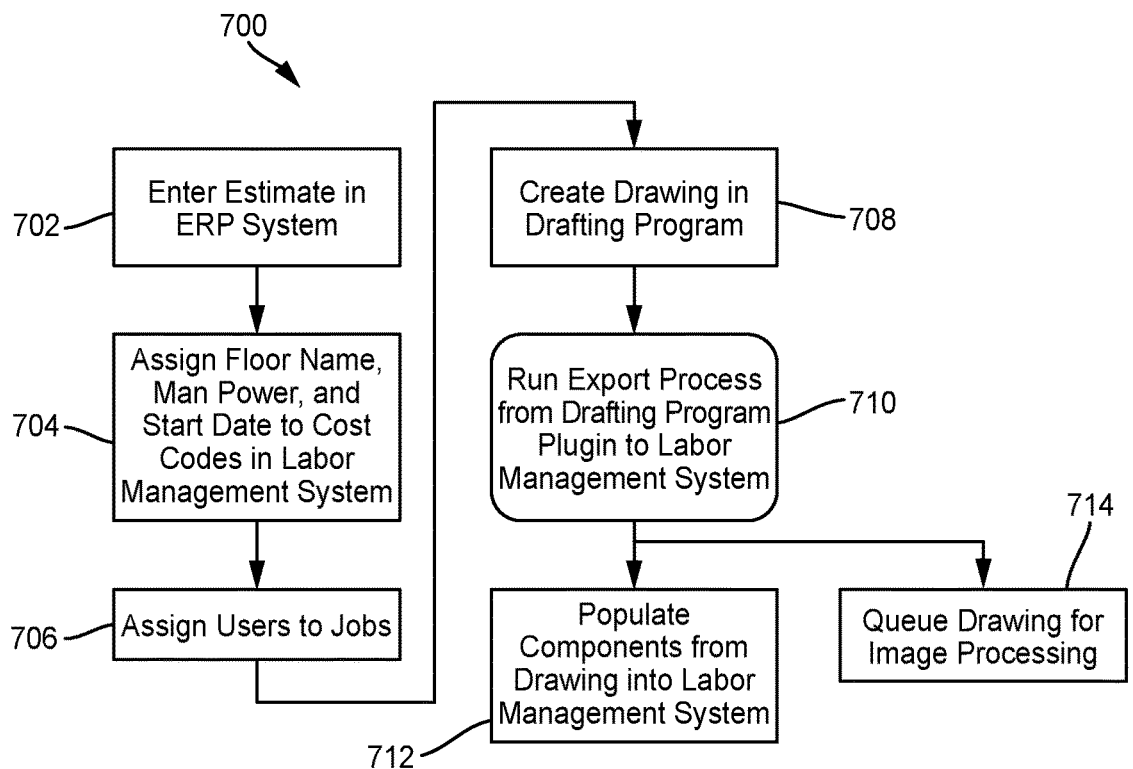
FIG. 4 depicts another exemplary flowchart of one or more illustrative aspects of the invention described herein.

Referring to FIG. 4, an exemplary workflow 700 for integrating an image or drawing into the labor management system 100 is depicted. In one or more embodiments, the method and workflow of FIG. 4 and the one or more steps disclosed therein may be performed in the order shown in FIG. 4 or may be performed in a different order. In some instances, one or more of the steps of FIG. 4 may be omitted or skipped.

Referring to FIG. 4, the exemplary method 700 may begin at step 702 where a user inputs the project estimate. In one embodiment, the project estimate may be entered into the ERP database. The estimate information may include the estimated total costs to complete the project, or it may include the estimate to complete certain tasks within the overall project. Cost codes associated with particular tasks may be retrieved from the ERP database and assigned to the project. The individual cost codes and the costs associated with those codes will make up the total costs of the project. Additional project identifiers and additional project information may also be entered at this step.

In step 704, a user may assign to each particular cost code certain additional information, such as the floor name, the man power needed to complete the particular task, and the start date for the task. This information is entered into and stored by the labor management system database. The user may also sequence the order in which the tasks are to be completed. Additional task information and parameters may also be inputted at this step.

In step 706, a user may assign certain personnel to the project. For example, the user may assign an executive, project manager or foreman to the project. These personnel may be identified by name or by an employee ID code. These personnel will have access to and in some situations, based on their authorization, the ability to modify or adjust the tasks or estimate for the project. They will also have the ability to access the real-time data to generate reports showing the status of the projects.

In step 708, a user may create one or more drawings or representations of the project under construction. These drawings may reflect one or more features or components of the structure or building under construction or may depict the entire structure or building under construction. The one or more drawings may be created by a known computer-aided design software, such as AutoCAD, or any other computer-aided design and drafting software application.

In step 710, the one or more created drawings from step 708 may be exported into the labor management system. This is performed by a drawing plug-in to the labor management system that exports the created drawings to the labor management system program.

In step 712, the components and features from the drawings are then populated into the labor management system program for later use by the program. The populated components may be the one or more units of the structure or building under construction or the units may the entire structure or building. Other aspects of the drawing or other data or information relating to the drawing may also be populated into the labor management system program at this step.

In step 714, the one or more created drawings from step 708 may also be queued for later image processing by the labor management system program.

Figure 5:
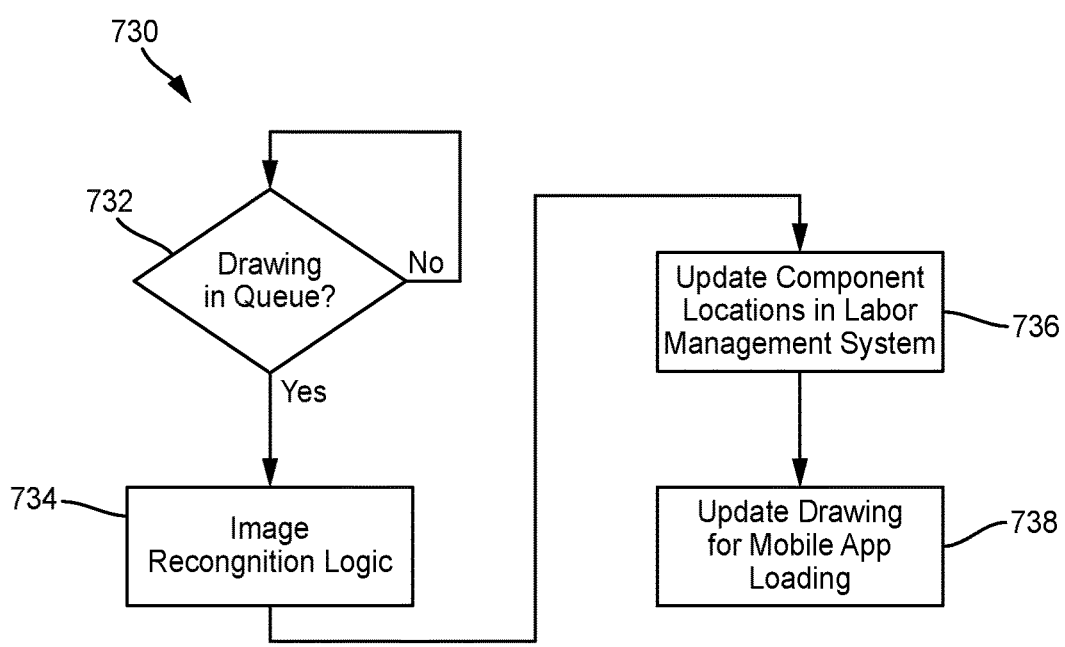
FIG. 5 depicts another exemplary flowchart of one or more illustrative aspects of the invention described herein.

Referring to FIG. 5, an exemplary workflow 730 for processing the drawing or image within the labor management system is depicted. In one or more embodiments, the method and workflow of FIG. 5 and the one or more steps disclosed therein may be performed in the order shown in FIG. 5 or may be performed in a different order. In some instances, one or more of the steps of FIG. 5 may be omitted or skipped.

Referring to FIG. 5, the exemplary method 730 may begin at step 732 where it is determined whether the one or more created drawings are in queue for further processing. If the one or more drawings are not in queue, the program will wait until the drawings are in queue. If the drawings are in queue, then at step 734 the one or more images will be image recognized through an image recognition program used by the labor management system. Any suitable image recognition program may be used to capture the drawing details and drawing information and data.

In step 736, the image recognized components or features and their locations are then updated in the labor management system program and stored for future use.

In step 738, the image recognized drawing may be updated to permit use of the drawing on a mobile application or program.

Figure 6:
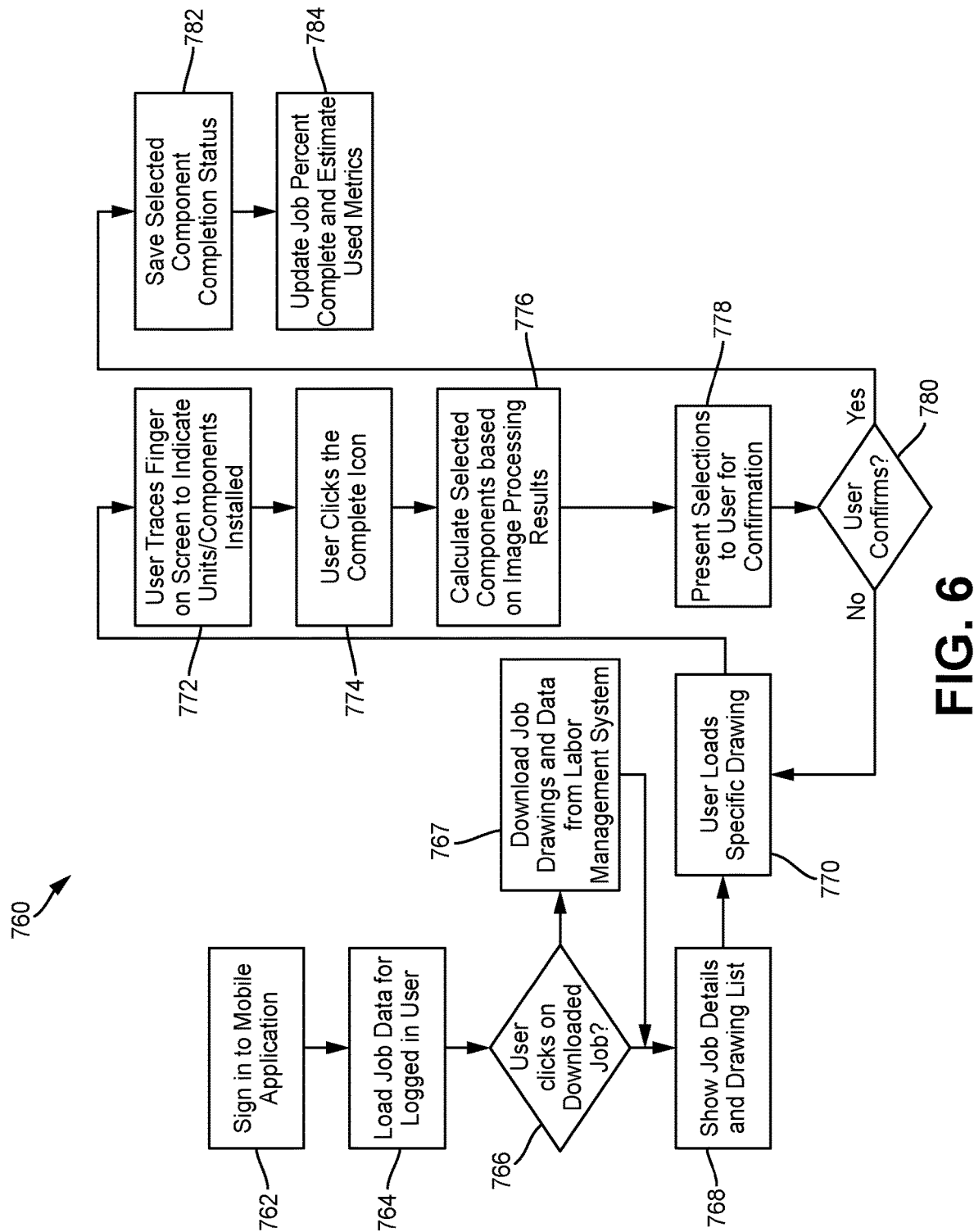
FIG. 6 depicts another exemplary flowchart of one or more illustrative aspects of the invention described herein.

Referring to FIG. 6, an exemplary workflow 760 for a mobile application that may be used with the labor management system is depicted. In one or more embodiments, the method and workflow of FIG. 6 and the one or more steps disclosed therein may be performed in the order shown in FIG. 6 or may be performed in a different order. In some instances, one or more of the steps of FIG. 6 may be omitted or skipped.

Referring to FIG. 6, the exemplary mobile application method 760 may begin in step 762 where a user may sign in or log in to the exemplary mobile application. The mobile application may be used on any suitable device, such as a smart phone, tablet, hand-held computing device or any other similar portable device.

In step 764, the mobile application with provide the user with information pertaining to the user, as well as any job or project data assigned to or accessible by the user. The user information and job data may be presented through a user interface provided by the mobile application.

In step 766, the user may select one or more jobs or projects and the data associated with the jobs or projects. Upon selecting a particular job or project, at step 767 the data and drawings associated with the job or project are downloaded from the labor management system onto the mobile device.

In step 768, the downloaded data and drawings are viewable and accessible through the user interface on the mobile device. The downloaded data may include job or project details, such as project description and dates for the project, and may include a list of drawings associated with the job or project.

In step 770, the user may select one or more drawings from the list of drawings downloaded to the mobile device. The user may then view the downloaded drawings and manipulate the drawings through the user interface. This manipulation may include enlarging, minimizing, moving, sliding, or other manipulation techniques.

In step 772, the user may select a particular feature on the downloaded drawing by tracing a finger on the user interface screen to indicate on the screen that one or more particular units or components are installed. The tracing may include sliding one's finger across the screen over one or more particular installed units. The tracing may also include circling with one's finger around the particular installed units or components or around a group of installed units or component.

In step 774, the user may then select the complete icon to indicate that he or she has selected the installed one or more units or components.

In step 776, the mobile application will then determine and calculate the selected components or completed tasks by the user based on the image processing results.

In step 778, the selected components will then be presented to the user to confirm the accuracy of the selected components.

In step 780, if the user does not confirm the accuracy of the selected components, meaning that the selected list of components is incomplete or inaccurate, the user will be given the option to download additional or different project drawings, and will then repeat the process of selecting via the tracing technique or other technique the particular tasks or components that are complete.

If the user confirms the accuracy of the selected components, then in step 782 the mobile application will save the selected component completion status.

In step 784, the mobile application will update the job percent complete, and may also estimate the hours used metrics, as described herein. The mobile application may accomplish this update locally or by communicating with the in-house labor management database which will update the job percent complete.

FIGS. 7-34 depict various exemplary user interfaces of the labor management system in accordance with one or more illustrative aspects discussed herein. Other user interfaces are possible and may be used with the teachings of the invention.

Figure 7:
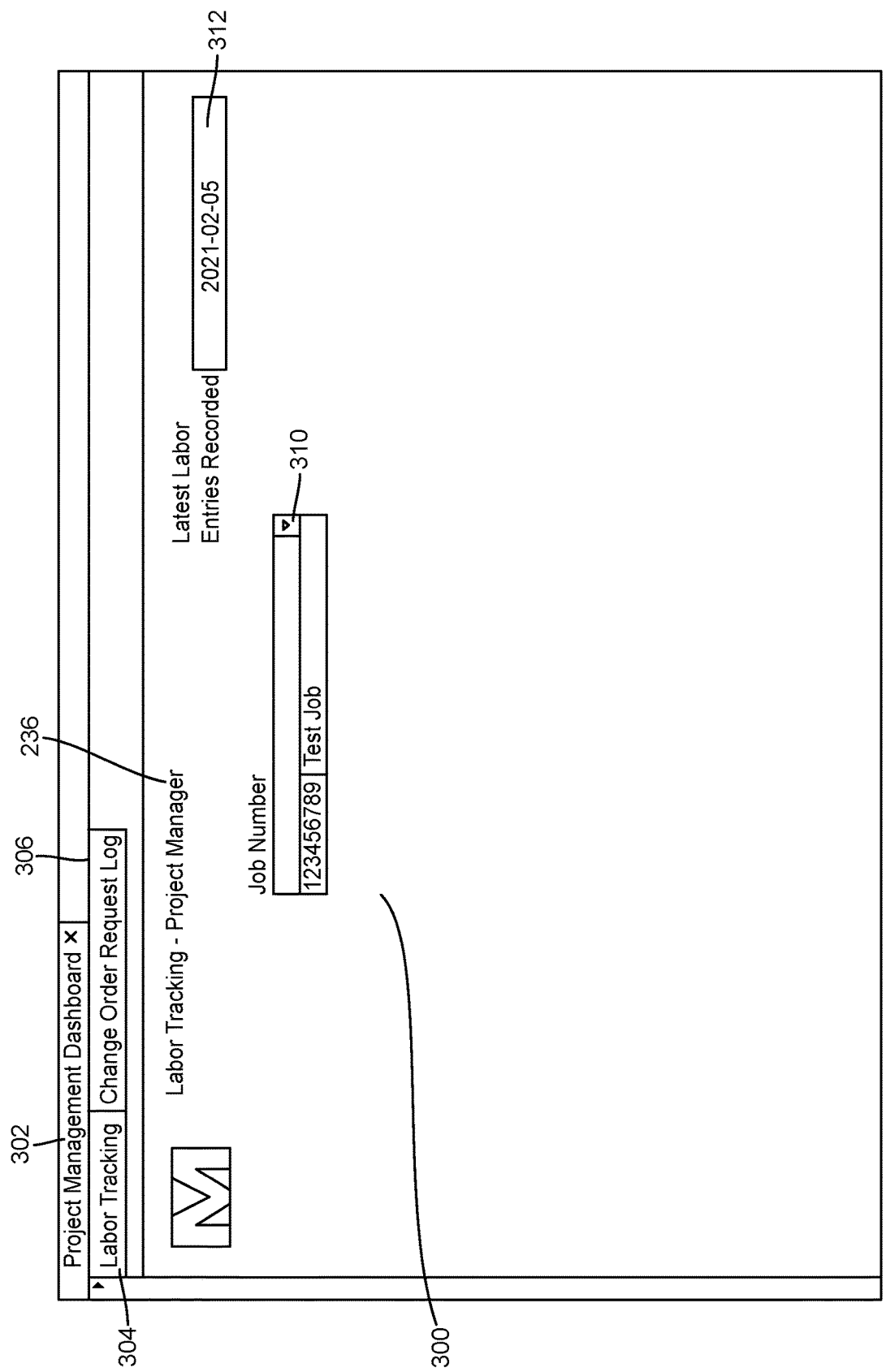
FIG. 7 depicts an illustration of exemplary aspects of the disclosed labor management system.

As shown in FIG. 7 on a mobile device, tablet, or desktop display a user interface 300 may include a project dashboard 302 that includes a number of selectable tabs. These tabs may include a labor tracking tab 304 and a change order request log 306. These tabs may be selectable by a user, such as a project manager or executive, and may be selectable from any of the possible devices on which the labor management system is loaded or accessed.

The labor tracking tab 304 user interface may be in the form depicted in FIG. 7. In an exemplary aspect, the labor tracking tab 304 may be accessed by a project manager, as indicated by the heading 308. The labor tracking tab 304 may further include one or more drop down menu options 310 that may provide access to one or more projects. The drop down menu may include information such as project number, project name, project code, etc. The description of the project name may include numerous other identifiers, such as project location, project address, building name, etc.

The drop down menu options 310 will populate with one or more projects for the particular user signed into the system and based on the access granted to them. For example, an executive may have access to more projects than a project manager and so when the executive is signed in and selects the drop down menu option 310, the executive may receive a list of numerous projects from which to select. In contrast, the project manager when signed in may have access to a more limited number of projects than an executive. The labor tracking tab 304 may also include an indicator 312 that reflects when the latest labor entries were recorded. This date will be updated as project labor entries are updated.

Figure 8:
FIG. 8 depicts another illustration of exemplary aspects of the disclosed labor management system.

FIG. 8 depicts another exemplary user interface of the labor management system in accordance with one or more illustrative aspects discussed herein. As shown in FIG. 8, after the user selects a project from drop down menu 310, exemplary information for the project may populate the user interface as shown in FIG. 8. In one aspect, a list of tabs 340 may be provided that offer various user options for the labor management system.

In one embodiment, tab 342 may be a cost code entry tab. Upon selecting tab 342, one or more cost codes 344 may be displayed in table form on the user interface as depicted in FIG. 8. The cost codes listed on the user interface are retrieved from the ERP database. Here, the user can input information for the cost code. For example, the user may assign a floor number 346, the amount of man power 348 needed to complete the task, and the start date 350 for the task represented by the cost code. The floor number may be an abbreviation L01, L02, L03, etc. representing the floor level. Other abbreviations may be used as a floor identifier. The man power 348 may be entered in units representing the number of individuals assigned to work on the task. The amount of man power may be adjusted through this user interface to account for changes in the status of the project and in the amount of man power needed to complete the task or project.

As depicted in FIG. 8, the cost codes may have pre-assigned cost code numbers 352, cost code descriptions 354, and the estimated hours 356 assigned to the cost codes. In an exemplary aspect, the cost codes can be sorted and displayed numerically, or they can be displayed based on similar task descriptions. The user interface may also include the project number 360, project title 362 and labor type 364. The user interface may also provide information regarding the type of estimate 366 for the project. This information may reflect whether the listed estimate is the original estimate, as depicted by FIG. 8, or a forecast. Other estimate or budget types can be provided on the user interface of FIG. 8. As depicted in FIG. 8, the user interface may include the man power 348 assigned per cost code, as well as the start date 350 for the task reflected by the cost code. The man power 348 may indicate whether zero, one, two, three or more individuals are assigned to the task.

FIG. 9 depicts another exemplary user interface of the labor management system in accordance with one or more illustrative aspects discussed herein. As shown in FIG. 9, and in an exemplary aspect, a labor track entry tab 370 may be selected from the list of tabs 340. In one embodiment, upon selecting the labor track entry tab 370, the cost codes that have been charged because of work done on the task may be listed on the user interface and may be listed in the order of when the cost codes were charged. In one example, the cost codes that have been charged most recently, may be listed first. As depicted, the date of the cost code charge is provided under the date of update 372. When the cost codes are updated with the new charges applied to the cost codes, the date of the update will change to reflect the new date. In one aspect, as the cost codes are charged, the user interface may include a completion of task 376 which reflects the percentage of the completion of the task. This percentage will inform the user of the status of the task and the remaining percentage of the task to be completed. In an exemplary aspect, the completion of task entries can be highlighted or change colors to reflect that the cost code has been recently charged to draw attention to this update to the project. The percentage also changes color after the user has changed the percentage after the cost code was charged, thereby highlighting to the user which percentages should be reevaluated.

FIG. 10 depicts another exemplary user interface of the labor management system in accordance with one or more illustrative aspects discussed herein. As shown in FIG. 10, and in an exemplary aspect, a labor floor report tab 390 may be selected from the list of tabs 340. In one embodiment, upon selecting the labor floor report tab 390, a report and user interface is provided that sorts the cost codes by floor and provides the subtotals for each floor. This allows the user to break the project into smaller sub-parts for easier project management.

As depicted in FIG. 10, the user interface may identify the selected floor 400 which will list out the cost codes 402 for the sub-tasks for that particular floor along with the labor type 404, the assigned estimated hours 406, and the hours used to date 408 for that particular task. This data may also be tabulated to provide the user with subtotals 410 for the estimated hours and the actual hours used for the sub-tasks for the particular floor. The labor floor report tab 390 may further provide in terms of a percentage the completion of the task 414 which reflects the percentage complete of the particular task. The labor floor report tab 390 may further identify the percentage of hours used 416 which is the percentage of hours used in relation to the estimated hours for the task. If the percentage of hours used 416 to complete the task is higher than the percentage complete 414 of the task, then the percentage may be highlighted in red or another color to indicate a potential issue with the task. This highlighted or flagged issue can then be assessed by the project manager and, if necessary, adjustments can be made in the field to complete the task within the estimated hours. The percentage complete 414 and percentage of hours used 416 may also be cumulated to provide the user with the cumulated percentage of floor completion 420 and cumulated percentage of floor hours used 422. Also provided on the labor floor report tab 390 is an indication of the date of the update 424 of the particular task, as well as a week ending date 426 for the report.

Figure 11:
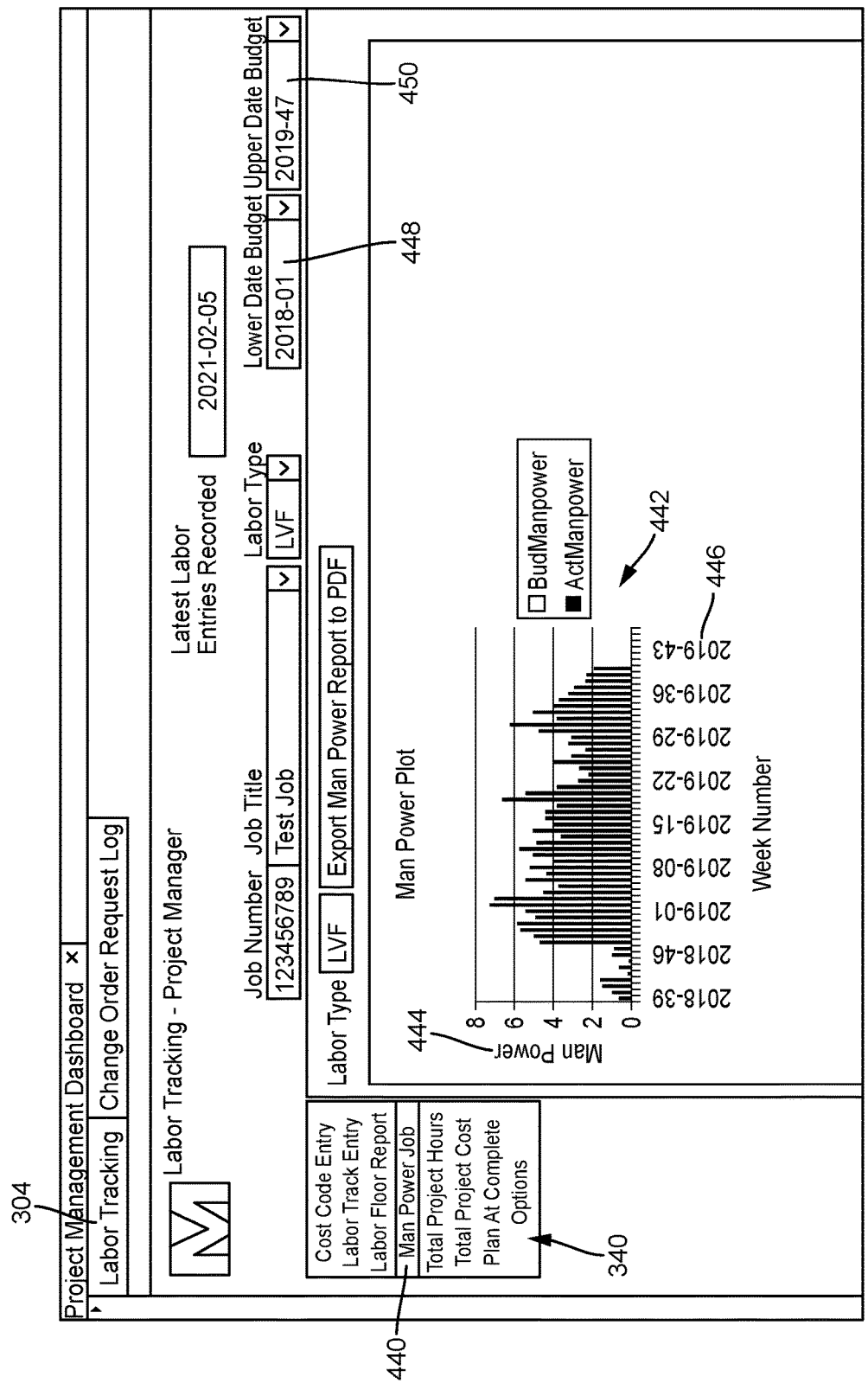
FIG. 11 depicts another illustration of exemplary aspects of the disclosed labor management system.

FIG. 11 depicts another exemplary user interface of the labor management system in accordance with one or more illustrative aspects discussed herein. As shown in FIG. 11, and in an exemplary aspect, a man power report tab 440 may be selected from the list of tabs 340. In one embodiment, upon selecting the man power report tab 440, a report 442 is provided that depicts a graph of the number of workers in the field 444 versus the week number 446. In general, the number of workers is inversely proportional to productivity so this graph allows management to ensure the correct number of workers are on the project. This graph provides immediate feedback as to the status of the project as well as trends so that the project manager can decide whether to make any adjustments to the man power for the project. The user interface permits the user to selectively choose the date ranges for the report by selecting the lower date bound 448 and the upper date bound 450. A new report may then be created for the selected date ranges.

Figure 12:
FIG. 12 depicts another illustration of exemplary aspects of the disclosed labor management system.

FIG. 12 depicts another exemplary user interface of the labor management system in accordance with one or more illustrative aspects discussed herein. As shown in FIG. 12, and in an exemplary aspect, a total project hours' tab 480 may be selected from the list of tabs 340. In one embodiment, upon selecting the total project hours' tab 480, a report and user interface is provided that shows the aggregate of all the hours estimated, used and the percent complete for the total project. If the percentage of hours used is greater than the percent complete of the project, a notification will be provided and the issue will be flagged.

As depicted in FIG. 12, the user interface may also identify the total hours used 482 for the project. This may be the cumulative total of the used hours for the entire project. The user interface may further identify the total hours quoted 484, that is estimated, for the entire project. The total project hours' tab 480 will then provide the percentage of the hours used 488 in relation to the estimated hours. If the percentage is greater than one hundred percent, then this reflects the project has exceeded the number of hours estimated for the project. In this situation, the percentage of hours used 488 may be highlighted in a different color or otherwise flagged to draw attention to the issue. A project manager can then assess in real-time whether to make adjustments to the forecast and/or assess changes needed in the field.

The total project hours' tab 480 may further provide the percentage of the completion of the project or building 490. If the percent hours used is greater than the percent building complete, then this percentage may be highlighted in a different color or otherwise flagged to draw attention to the issue. This situation reflects an incomplete project that has exceeded the estimated number of labor hours. The total project hours' tab 480 may also provide the delta percent total 492, which is a calculation of the difference in the percentages between the percentage of the project completed 490 and the percentage of hours used 488. If the delta percentage is a negative percentage, this reflects the project has exceeded its assigned amount of labor hours and is under-completed. This real-time feedback of the project status allows the project manager to make real-time adjustments to the man power or forecast for the project.

Figure 13:
FIG. 13 depicts another illustration of exemplary aspects of the disclosed labor management system.

FIG. 13 depicts another exemplary user interface of the labor management system in accordance with one or more illustrative aspects discussed herein. As shown in FIG. 13, and in an exemplary aspect, a total project cost tab 500 may be selected from the list of tabs 340. In one embodiment, upon selecting the total project cost tab 500, a report and user interface is provided that shows the aggregate of all the costs estimated and used, as well as the percent complete of the project. If the percentage of the estimated cost used is greater than the percentage complete of the total project, a notification will be provided and the issue will be flagged. This total project cost tab report also shows the estimated and actual hourly rate of the workers assigned to the project.

As depicted in FIG. 13, the user interface may identify the total cost used 502 for the project. This may be the cumulative total of the costs for the entire project. The user interface may also identify the total costs estimated 504 for the entire project. The total project costs tab 500 may provide the percentage of the costs used 506 in relation to the estimated costs. If the percentage is greater than one hundred percent, then this reflects that the project costs have exceeded the total costs estimated for the project. In this situation, the percentage of costs used may be highlighted in a different color or otherwise flagged to draw attention to the issue.

The user interface may also provide a tabulation of the actual average hourly rate 514 of each worker and the average hourly rate estimated 516 of each worker to provide a comparison of the rate expended per hour per worker on the project versus the estimated rate per hour per worker. This comparison provides a real-time feedback of the average labor costs per worker at a particular stage of the project.

The total project costs tab 500 may further provide the percentage of the completion of the project or building 510. If the percent cost used is greater than the percent building complete, then this percentage may be highlighted in a different color or otherwise flagged to draw attention to the issue. This situation reflects an incomplete project that is over the estimate. The total project costs tab 500 may also provide the delta percent total 512 that is a calculation of the difference in the percentages between the percentage of the project completed 510 and the percentage of costs used 502. If the delta percentage is a positive percentage, this reflects that the project is still under the estimate. If the delta percentage is a negative percentage, then this reflects the project is over the estimate and under-completed. This real-time feedback of the project status allows the project manager to make real-time adjustments to the man power or forecast for the project.

Figure 14:
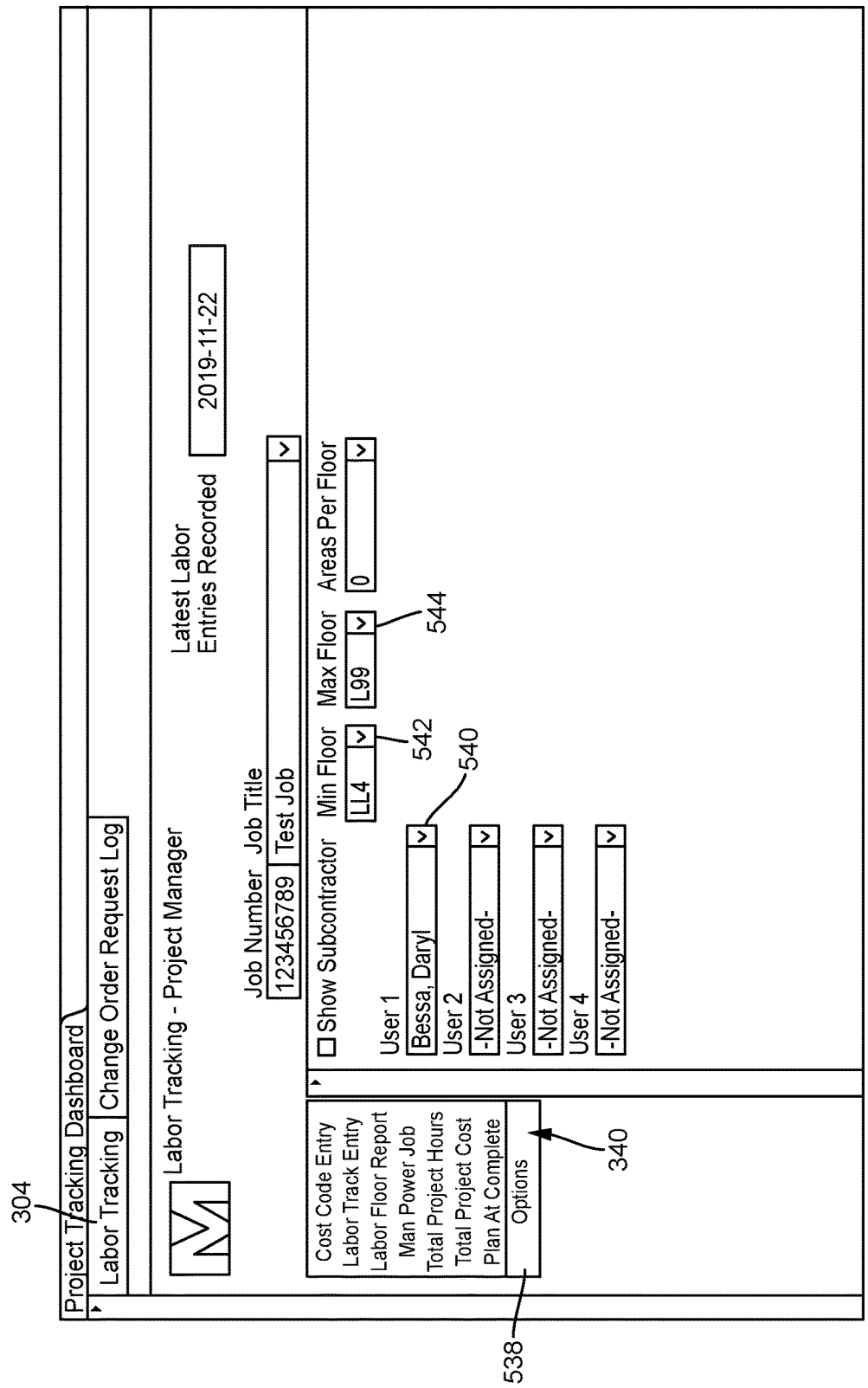
FIG. 14 depicts another illustration of exemplary aspects of the disclosed labor management system.

FIG. 14 depicts another exemplary user interface of the labor management system in accordance with one or more illustrative aspects discussed herein. As shown in FIG. 14, and in an exemplary aspect, an options tab 538 may be selected from the list of tabs 340. In one embodiment, upon selecting the options tab 538, a user interface is provided that allows the user to assign multiple people to see the status of the project. In one aspect, an executive or the project manager may assign the people who can see the status of the project. As depicted in FIG. 14, the user may select from several drop down menus 540 a person's name and that person will then be assigned to the project. The user can set a minimum floor 542 and maximum floor 544 so as to limit the drop-down menus when assigning floors to cost codes on the cost code entry tab.

Figure 15:
FIG. 15 depicts another illustration of exemplary aspects of the disclosed labor management system.

FIG. 15 depicts another exemplary user interface of the labor management system in accordance with one or more illustrative aspects discussed herein. As shown in FIG. 15, in an exemplary aspect, on the cost code entry tab 342, the user may select the labor type 364 and the user interface will provide a drop down menu of the different labor type options 365. At any point the user can filter the labor type using the labor type 364 drop down menu and the filtered labor types will be depicted on the user interface.

FIG. 16 depicts another exemplary user interface of the labor management system in accordance with one or more illustrative aspects discussed herein. As shown in FIG. 16, in an exemplary aspect, on the total project cost tab 480, the user may select the budget type 366 and the user interface will provide a drop down menu of the different estimate type options. In one embodiment, the budget type may be the original estimate. In another embodiment, the budget type may be a forecast at complete 367. At any point the user can filter the budget type using the budget type 366 drop down menu and the filtered budget types will be depicted on the user interface.

In one aspect, if the forecast at complete budget is selected, the fields that are displaying the forecast at complete, such as the total cost forecast 369 for the entire project, may be provided in different colors to draw a distinction from the original estimate. Being able to see the forecast of the project at completion provides the user with real-time feedback as to the status of the project and the direction the project is heading, that is, whether under-estimate/forecast or over-estimate/forecast, and allows the user to make adjustments to the man power or forecast in real-time.

Referring to FIG. 17, in one exemplary aspect of a user interface, on the cost code entry tab 342, the filtered budget type is shown as forecast at complete 367. The forecast at complete 570 report provides the user with information concerning the amount of man hours expected to be used by the time of completion of the particular task for the project. This information provides user feedback of the number of hours likely needed for the particular task and allows the user to compare the expected final numbers with the current number of hours.

Figure 18:
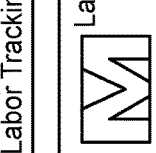
FIG. 18 depicts another illustration of exemplary aspects of the disclosed labor management system.

Referring to FIG. 18, in one exemplary aspect of a user interface, on the labor track entry tab 370, the filtered estimate type is shown as forecast at complete 367. The forecast at complete 580 report provides the user with information concerning the amount of man hours expected to be used by the time of completion of the particular task for the project. Also depicted is the forecast to complete 582 report which tabulates and displays the projected number of man hours needed to complete the particular task. This forecast to complete 582 is the difference between the actual number of hours used 584 and the forecast at complete 580 hours. These numbers may be provided in different colors to draw attention to them. Further shown on FIG. 18 is the percentage of completion 586 of each task. This information provides additional feedback of the number of hours likely needed to complete the particular task.

Figure 19:
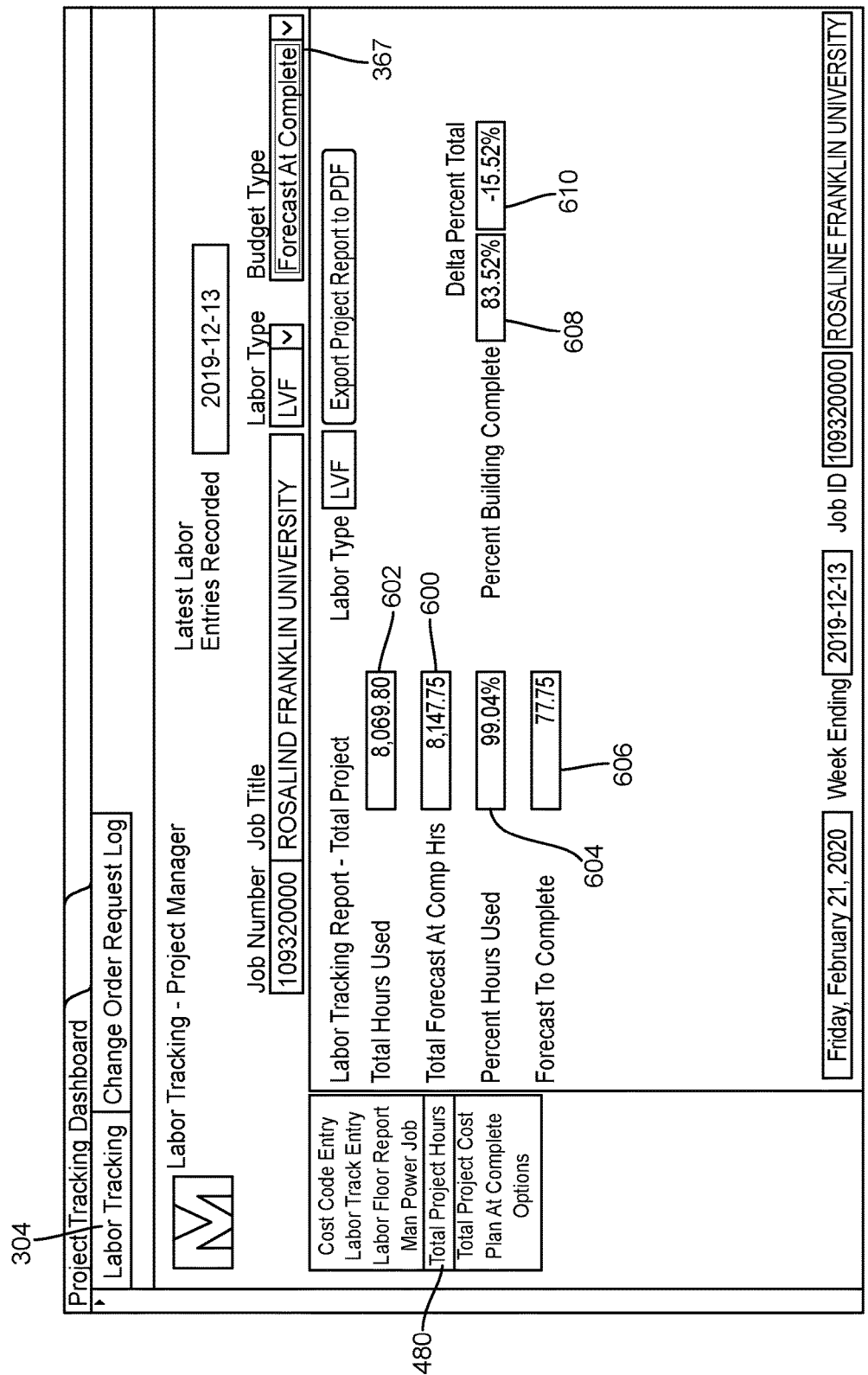
FIG. 19 depicts another illustration of exemplary aspects of the disclosed labor management system.

Referring to FIG. 19, in one exemplary aspect of a user interface, on the total project hours' tab 480, the filtered budget type is shown as forecast at complete 367. With this selection, the labor tracking report for the total project will display information concerning the total forecast at complete project hours 600. This number reflects the projected total number of hours going forward to complete the project. The total project hours' tab 480 may also display the total hours used 602 for the project. This would be the total hours used to date on the project. Also calculated and displayed is the percentage of hours used 604 toward the project. This tabulation is the ratio of total hours used 602 to the total forecast at complete hours 600 and presented in terms of a percentage. The labor tracking report may also display the forecast to complete hours 606 which are the total projected number of hours needed to complete the project. These numbers may be highlighted in different colors to draw attention to them in the event the total forecast at complete is not falling within the original estimate.

Also shown on the total project hours' tab 480, is a display of the percentage of the project or building completion 608. This percentage reflects the percentage complete of the project. A delta percent total 610 may also be provided which is the difference of the percent project complete 608 and the percent hours used 604. If the percent project complete is less than the percent hours used, this results in a negative difference, meaning the project is behind the projected number of hours needed to complete the project. Conversely, if the percent project complete is greater than the percent hours used, this results in a positive difference, meaning the project is ahead of the projected number of hours needed to complete the total project. This type of information is yet another example of additional feedback of the progress of the total project, and allows a user to make adjustments to the man power or estimate for the project, if necessary, and in real-time.

FIGS. 20-23 depict various exemplary embodiments of an administrator user interface for use with one or more aspects of the labor management system disclosed herein. Other administrator user interfaces are possible and may be used with the teachings of the invention.

Referring to FIG. 20, in an exemplary aspect, a job tracking page 640 is depicted and includes one or more job listings under the heading job number 642 and corresponding job name 644. As depicted, other job information may be presented on the job tracking page 640, including the customer name 646, labor type 648, location of the job site 650, its address 652 and whether the job is still active 654. The job tracking page 640 not only lists one or more jobs, it is also searchable for the desired job or project.

The job tracking page 640 further allows the administrator or user to filter by specific jobs. It does this through the multiple search filters 656. In an exemplary embodiment, the search filters may include searching by job number, job name, customer or status. It should be understood that other search filters may be used to permit different types of searches to be performed of the job listing database. From the job tracking page 640, an administrator or user can select one of the jobs to obtain additional details about the job.

Referring to FIG. 21, in an exemplary aspect, a detail listing of a particular job from the job tracking page 640 is depicted. As shown, the selected job 660 may be illustrated at the top of the user interface page 662. Also included on the user interface page 662 may be one or more additional details about the job. For example, the job details may include an overview 664 that provides high level information about the job, including the job number 668, job name 670, the status 672, the labor type 674, the customer name 676, project managers 678, and a job site address 680. Also depicted on the lower portion of the user interface page 662 is a list of all drawings 682 associated with the job that have been uploaded into the labor management system. The user interface further provides information as to whether or not the image processing logic has run, along with the date the image was processed 690, and whether the images reflected by the drawings are ready for the mobile application, as indicated by the image status 692.

Referring to FIG. 22, the administrator or user may select one of the drawings listed in FIG. 21 to obtain more information about the drawing. As depicted in FIG. 22, upon selecting one of the drawings, a pop-up screen 694 may be displayed that provides the details of the selected drawing associated with the job. The additional details may include the status information reflected in FIG. 21, as well as the mapping between a layer 696 in the drawing and an associated cost code 698 in the labor management system. At the bottom of the pop-up screen may be one or more options including closing the screen 702, saving any changes made to the details reflected by the screen 704, or uploading one or more files 706 to allow for a manual import of drawing data or additional information.

Figure 23:
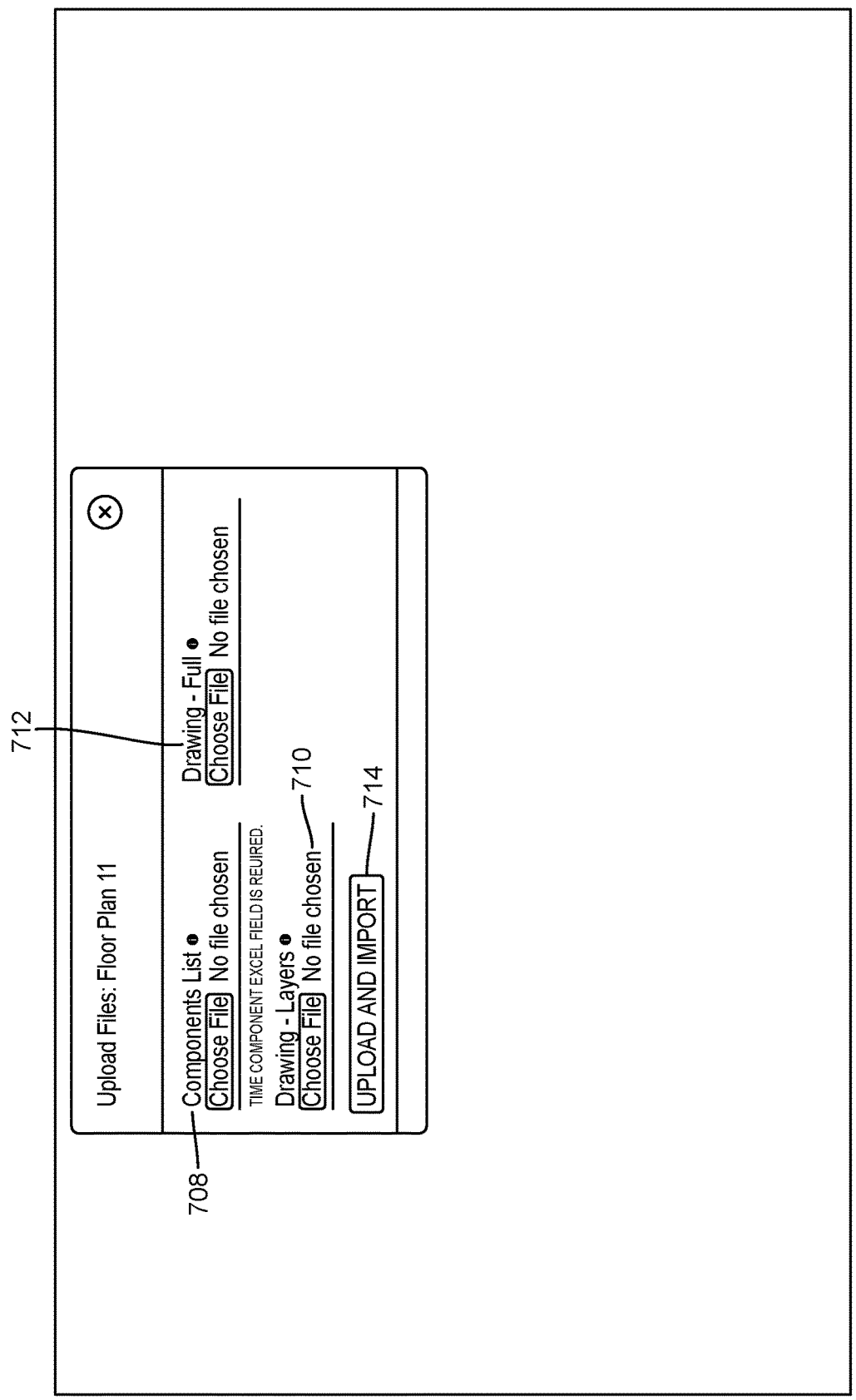
FIG. 23 depicts another illustration of exemplary aspects of the disclosed labor management system.

Referring to FIG. 23, in an exemplary aspect, if the administrator or user chooses to manually import drawing data or additional information, the administrator or user may choose from one or more locations to select the drawing data or other information. In one embodiment, and by way of example only, an Excel file of all the components in the drawings, including their position in AutoCAD space may be uploaded at 708. Alternatively, an image file with the key layers, such as the layers that map to a cost code, may be uploaded at 710. Moreover, an image file with all drawing and layer information for presentation in the mobile application may be uploaded at 712. The uploaded files may be imported into the labor management system at 714. In an exemplary aspect, uploading the files and associated data will queue a request to the image processor to perform image recognition logic and map the AutoCAD coordinates to image pixels. This will then enable the mobile application functionality of tracing the drawing to select components for further updates to the drawing and project.

FIGS. 24-29 depict various exemplary embodiments and features of a mobile application user interface for use with one or more aspects of the labor management system disclosed herein. Other mobile application user interfaces are possible and may be used with the teachings of the invention.

Figure 24:
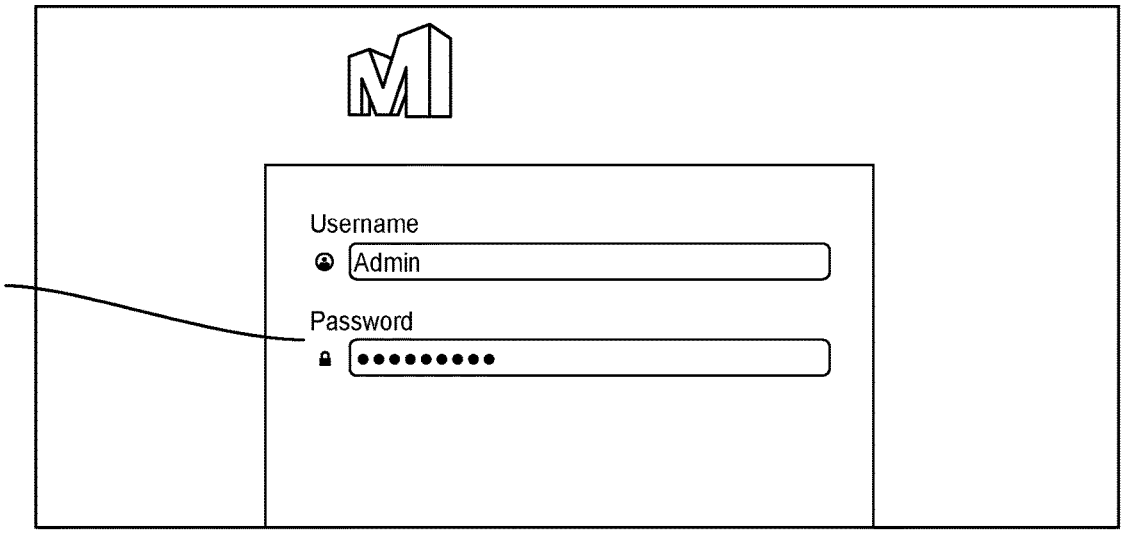
FIG. 24 depicts another illustration of exemplary aspects of the disclosed labor management system.

Referring to FIG. 24, in an exemplary aspect, a mobile application login page 800 is depicted and may include the option to provide a user name 802 and password 804. The login page may provide further information concerning the mobile application as well as the name of the company or other branding information. The mobile application for the labor management system may use various other types of user authentication mechanisms. In one embodiment, the labor management system may store usernames and passwords in the application database that may be used to verify the user of the mobile application.

Figure 25:
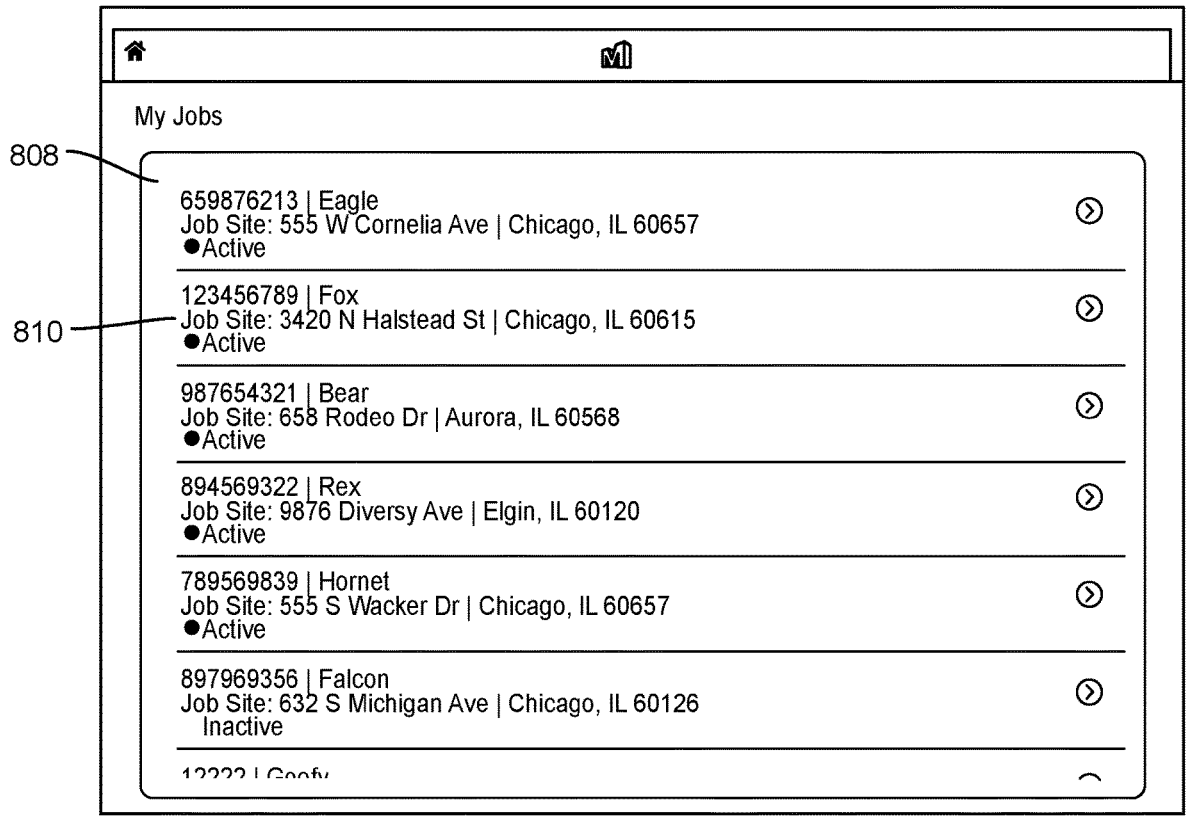
FIG. 25 depicts another illustration of exemplary aspects of the disclosed labor management system.

Referring to FIG. 25, after a user is logged in to the mobile application for the labor management system, in one aspect, a listing of jobs 808 assigned to or associated with the user will be provided on the user interface. The listing of jobs may include all active jobs assigned to the user, as depicted in FIG. 25. Basic job site information 810, such as the job site name and address, may be displayed. The user interface and mobile application allow the user to select one or more of the listed jobs to then obtain additional information concerning the job. Status information, such as active or inactive, may also be displayed on the user interface, as shown in FIG. 25.

Figure 26:
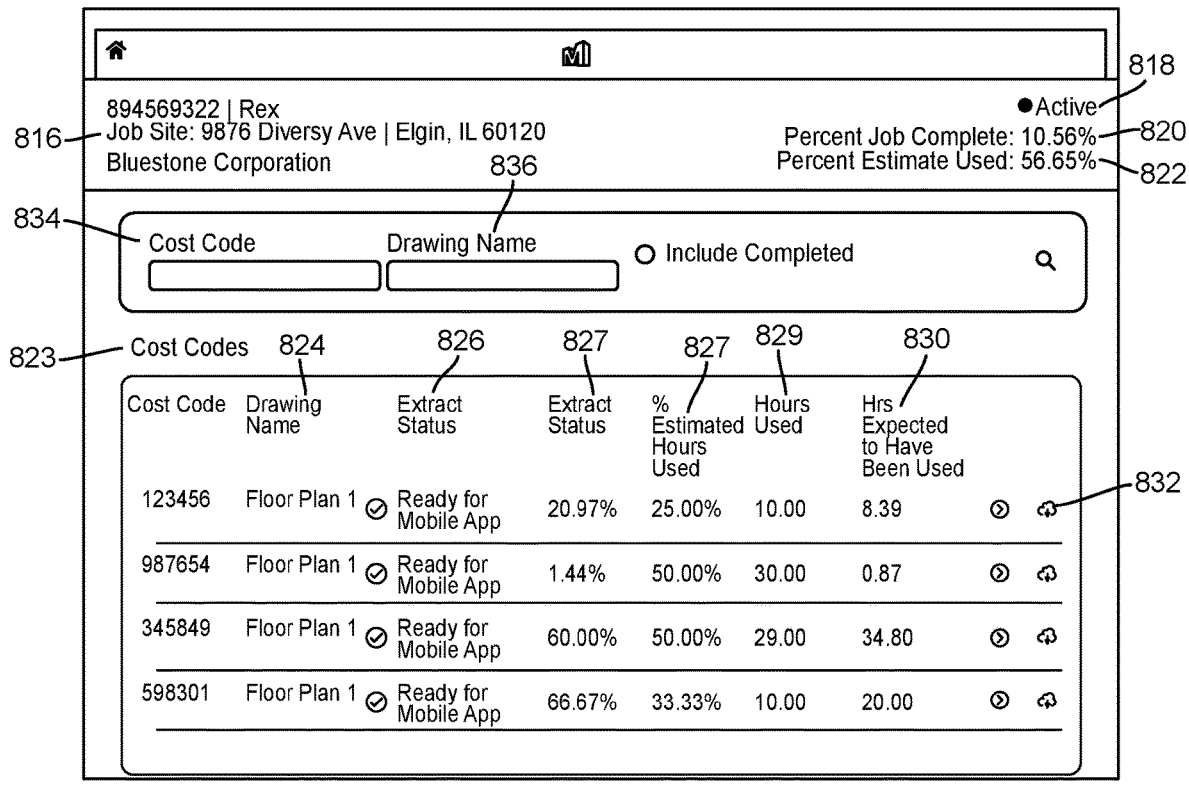
FIG. 26 depicts another illustration of exemplary aspects of the disclosed labor management system.

Referring to FIG. 26, if a user selects one of the jobs listed in FIG. 25, the user is then taken to a job detail screen 814. The job detail screen 814 will provide more details concerning the job, including the job site address 816, the status of whether the job is active or inactive 818, and the percentage of the job complete 820 and the percentage estimate of labor used 822. This information will give the user instant feedback as to the status of the job. Also depicted on the job detail screen 814 is a table showing the cost codes 823 available for the job. Displayed with each cost code will be the drawing name 824, the extract status 826 which indicates that the cost code is ready for the mobile application, a percentage of the units installed 827, a percentage of the estimate used 828, a total number of hours used 829, and the hours expected to have been used 830. This detailed information provided to the user will allow the user to quickly understand the status of the particular job and whether adjustments to the job need to be made, as described herein. It will also allow the user to see and understand the full cost code breakdown and the installation percentage per cost code, as well as the estimate percentage consumed per cost code and the actual and estimated number of hours used. This further level of detail will assist the user in understanding at a more granular level the state of completion of the particular project. In an exemplary aspect, these percentages and numbers may change color to indicate whether the percentages and numbers are outside an acceptable range or value, to allow a visual indication as to whether there is a concern with the status of the project. In another aspect, each individual cost code breakdown is selectable by the user to then take the user to further details concerning each cost code.

In another aspect, the job detail screen may further include an icon 832 or other indicator that may change colors to indicate whether the mobile application has the data stored locally on the mobile device, or whether the user still needs to download the drawing and components from a master list. In yet another aspect, the mobile application will provide search capabilities to allow the user to search for a particular cost code 834 or drawing name 836.

Figure 27:
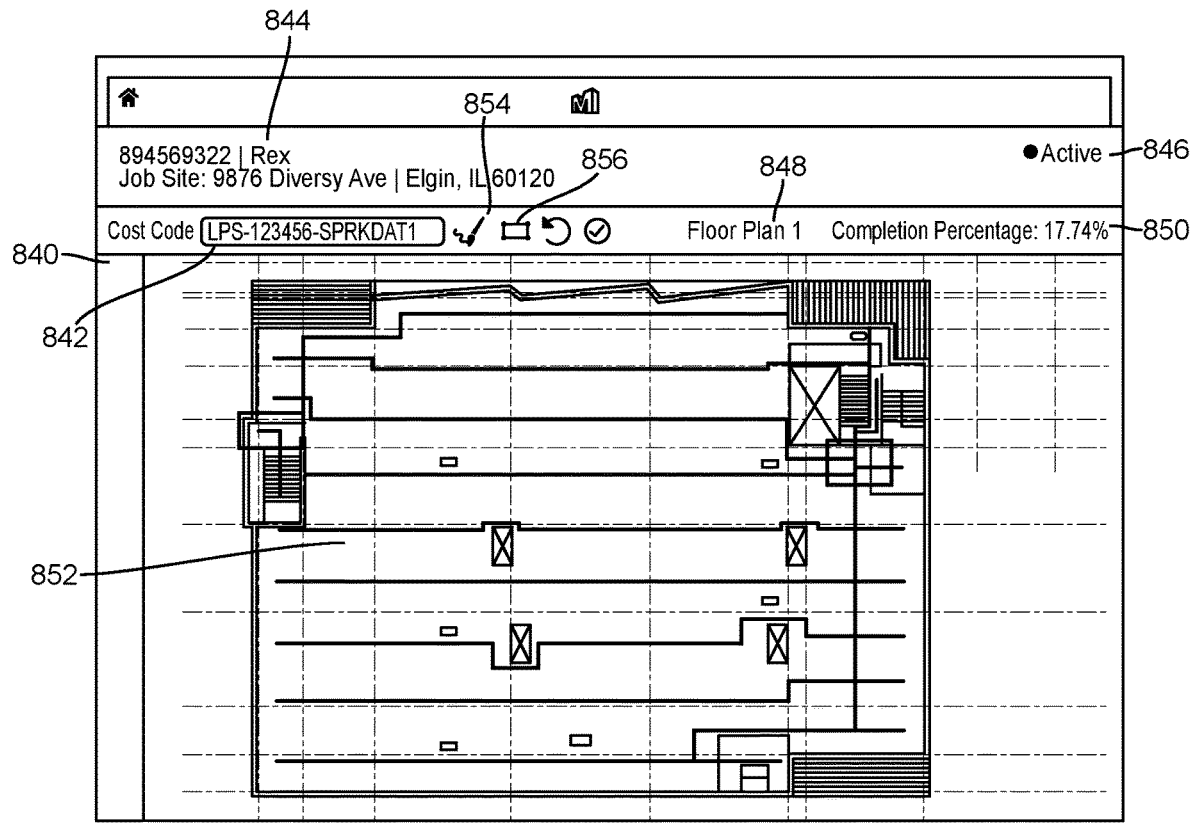
FIG. 27 depicts another illustration of exemplary aspects of the disclosed labor management system.

Referring to FIG. 27, if a user selects a particular cost code from FIG. 26, the user will be presented with more specific information concerning the cost code. As shown in FIG. 27, the cost code user interface page 840 may include the cost code number 842, the job description 844, whether the job is still active 846, a description of the drawing name 848, and the completion percentage 850 for the component of the project. As depicted, the screen may include the main drawing 852 that the user may interface with. In one aspect, the user may select a specific cost code 842 from the toolbar above the drawing and may then select either the finger painting icon 854 or box selection 856 mode to permit the user to then highlight one or more portions of the drawing.

Figure 28:
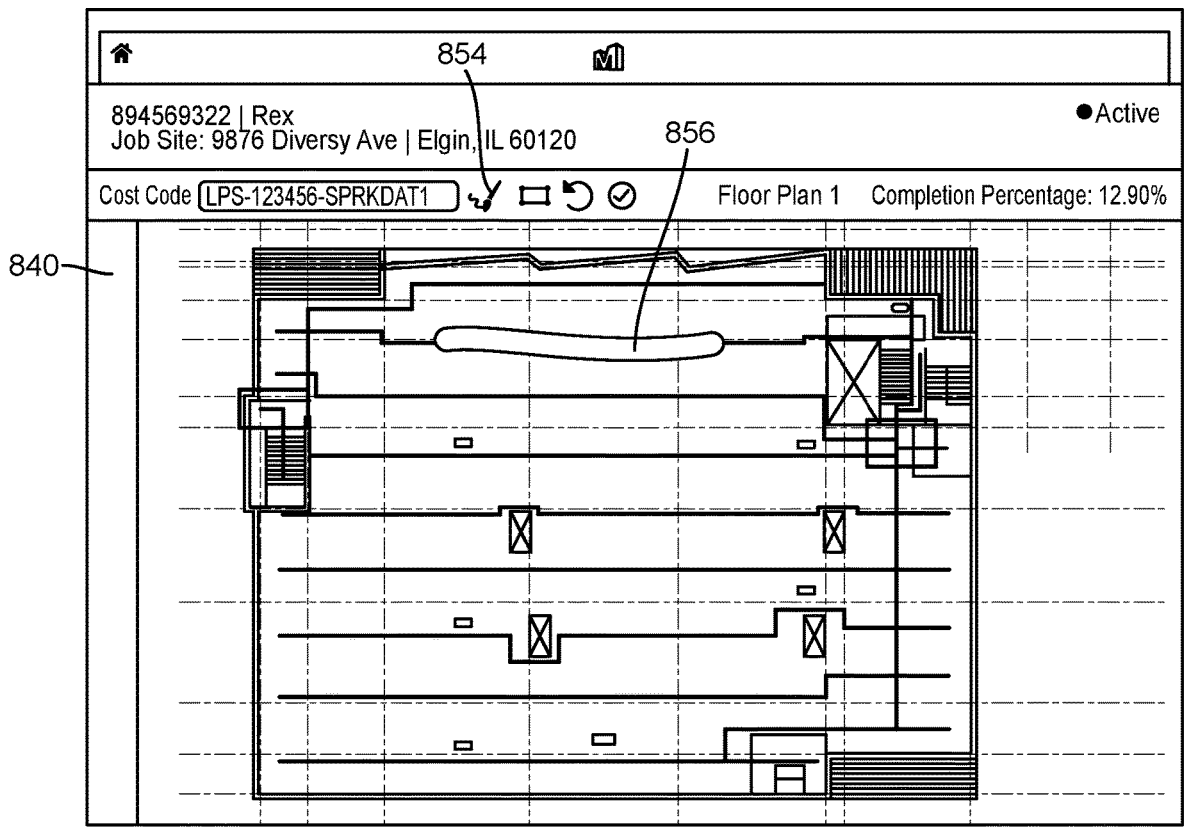
FIG. 28 depicts another illustration of exemplary aspects of the disclosed labor management system.

Referring to FIG. 28, an exemplary user interface page 840 is depicted after a user has selected the finger painting icon 854, which will then be shown in a lightened color, and after a user has used his or her finger or stylus to highlight or paint 856 portions of the drawing. The finger highlighting or painting 856 may extend across one or more portions of the drawing to identify those portions of the drawing depicted on the screen to thereby capture the metadata reflected by the portions of the drawing. The user may repeat the finger highlighting or painting on multiple portions of the drawing to capture the metadata reflected by those highlighted portions, if desired. The user may highlight across the desired portions of the drawing or may circle or draw a box around the desired portions. Other techniques for highlighting or indicating portions of the drawing are possible and are considered within the scope of the invention.

After a user has completed selecting portions of the drawing and capturing the associated metadata with the finger highlighting or painting feature and after the use has selected save on the drawing screen, in FIG. 29, a user will be taken to a selected components screen 860 that lists out the selected features or components from the highlighted drawing of FIG. 28. The selected components screen 860 will provide all the components that are selected based on the cost code and the finger painting selection (or box selection if that tool is used to select the desired features or components on the drawing). A user can then review the list of selected components or features and review their installation summary as reflected at 861. A user can also select and mark as installed at 862 those components 864 that are in fact installed. Once the user has marked all the desired components or features as installed, the user has the option to save this updated data, by selecting icon 866. By saving the data on this selected components screen page 860, the labor management system will then update the labor tracking database to reflect the new units installed. It will also update the percent complete calculations 863, as listed on the installation summary 861.

Figure 30:
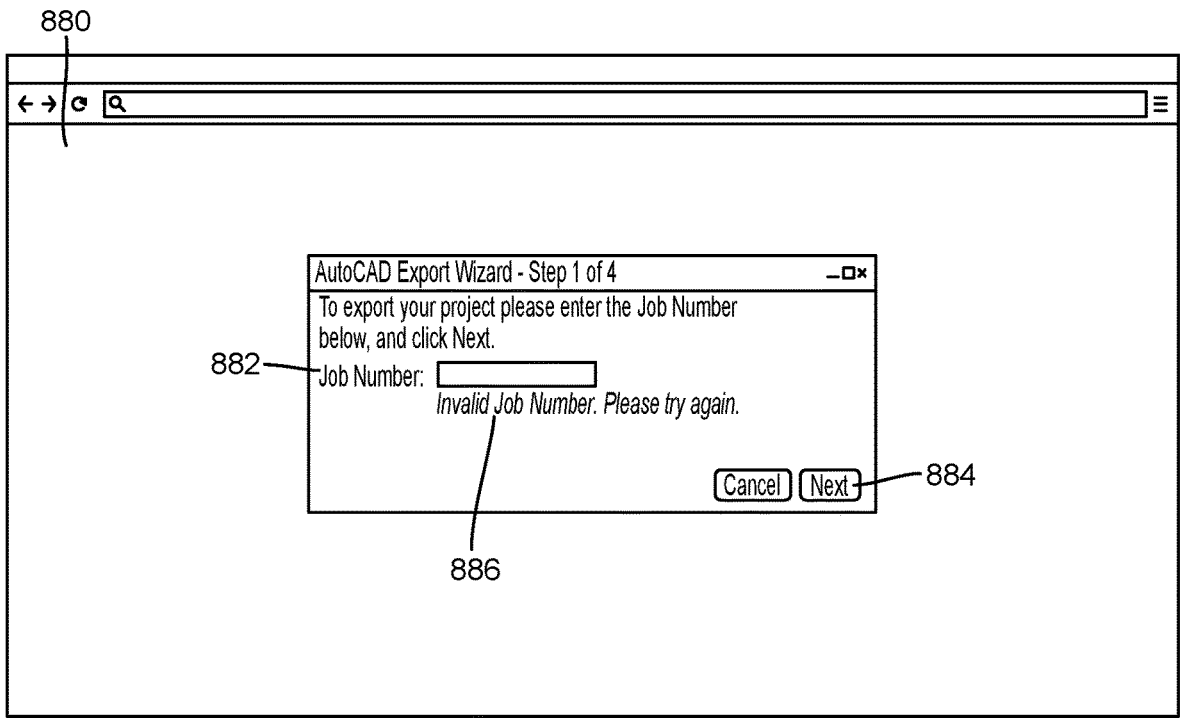
FIG. 30 depicts another illustration of exemplary aspects of the disclosed labor management system.

FIGS. 30-34 depict various exemplary embodiments of an AutoCAD Export interface for use with one or more aspects of the labor management system disclosed herein. Referring to FIG. 30, in an exemplary aspect, an AutoCAD interface may be presented from a menu item in the labor management system and may be used with the labor management system to export drawings to the labor management system. In an exemplary aspect, a user interface screen 880 may include an option to enter the job number at 882. After the job number is entered, a user can select next 884 after which the labor management system will validate the number against the database. If the job number does not exist in the database, an error message 886 will appear and will invite the user to enter a valid job number. If the job number is validated, the user will be taken to a screen 887 depicted in FIG. 31.

Figure 31:
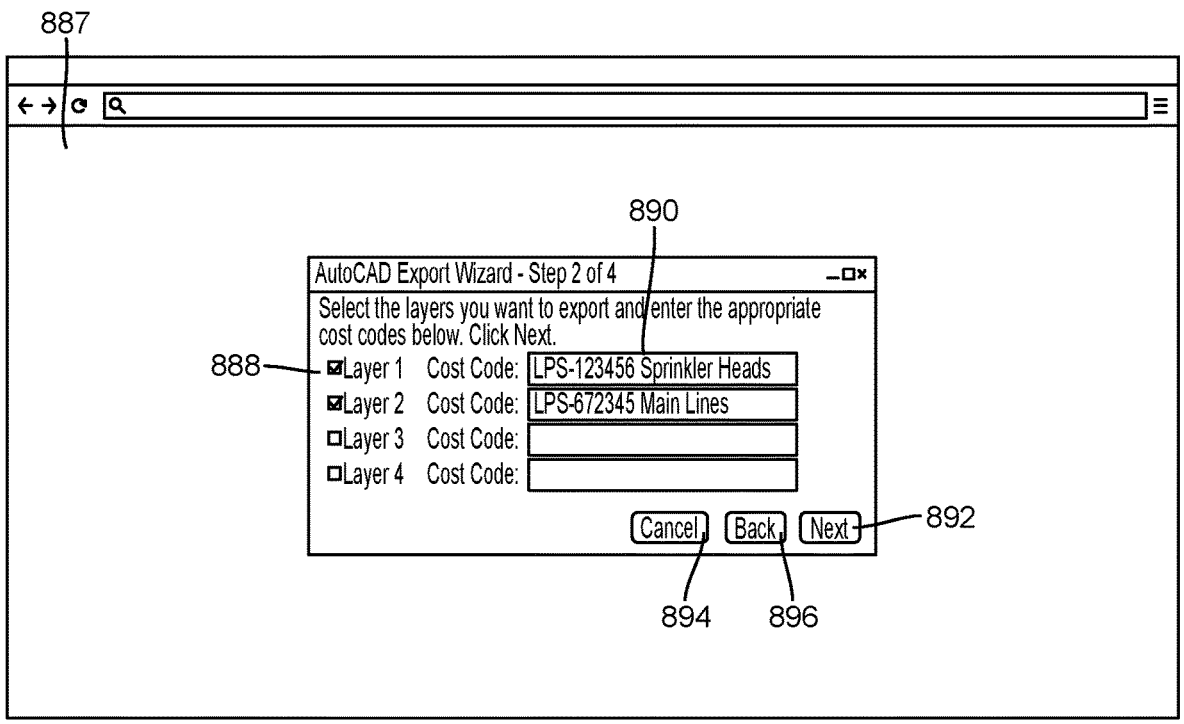
FIG. 31 depicts another illustration of exemplary aspects of the disclosed labor management system.

In FIG. 31, on screen 887, the user will see one or more drawing layers 888 associated with the job number. The user will then enter the corresponding cost code 890 from the labor management system. This will then associate the drawing layer to the cost code. The labor management system will then validate the cost codes before permitting the user to continue. Once validated, the user can then select next 892. Alternatively, the user can select cancel 894 to cancel the correlation of the cost code with the drawing layer, or the user can select back 896 to return to the user interface screen 880 where the user can enter a different job number.

Figure 32:
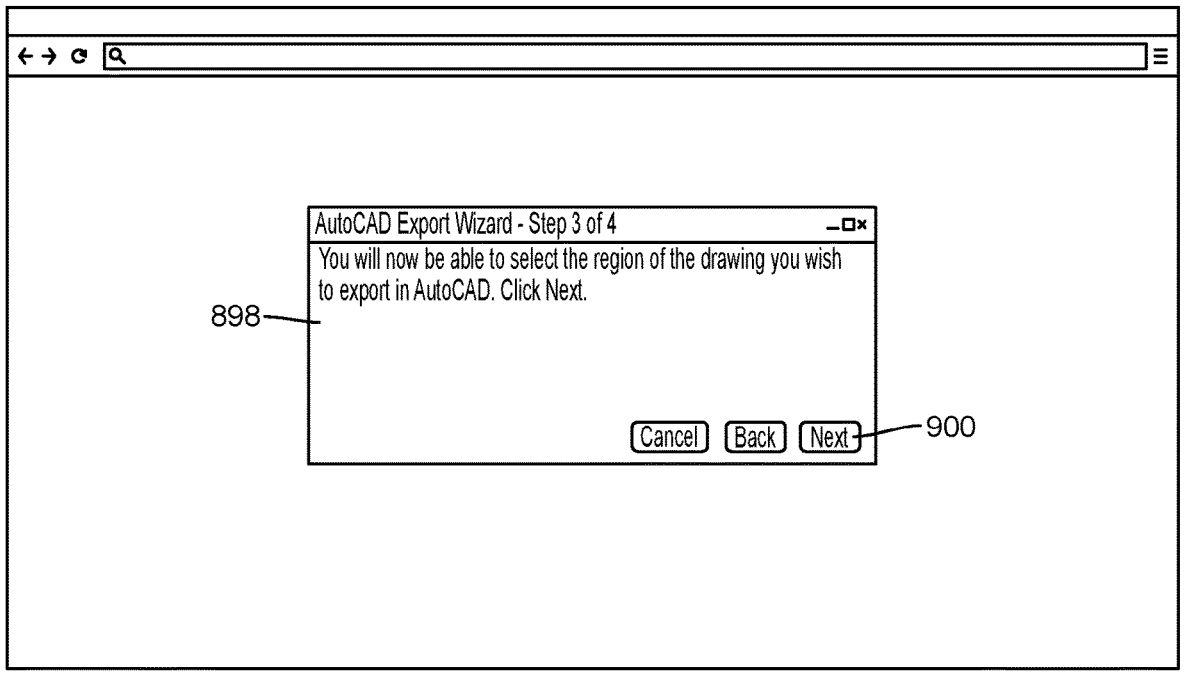
FIG. 32 depicts another illustration of exemplary aspects of the disclosed labor management system.
Figure 33:
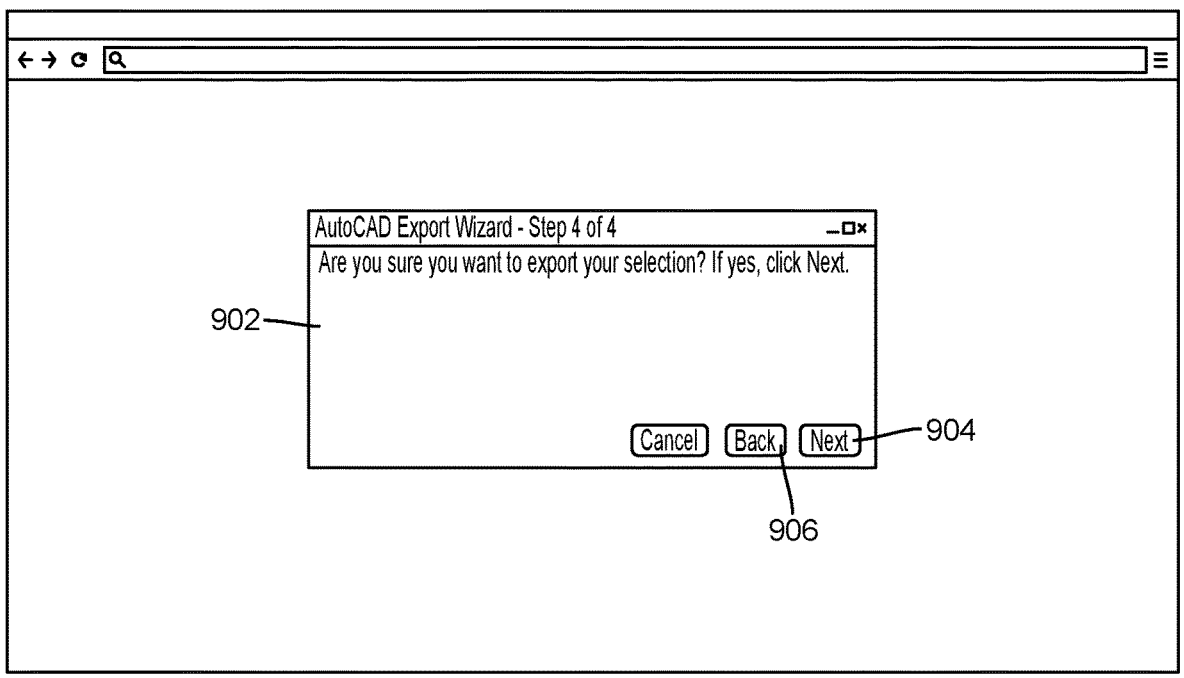
FIG. 33 depicts another illustration of exemplary aspects of the disclosed labor management system.

After entering the cost code 890 information in FIG. 31, the user will be taken to the pop-up screen 898 shown in FIG. 32. The user will be prompted to select a region of the AutoCAD drawing to export. The user will then make a box style selection within the AutoCAD viewspace to select the desire region to export. After this step is performed, the user can either select cancel, back or next. If the user proceeds and selects next 900 on pop-up screen 898, the user will then be taken to the pop-up screen 902 shown in FIG. 33 where the user will confirm its selection. As shown in FIG. 33, the user has the option to confirm the selection by selecting next 904. Alternatively, the user can select back 906 to redo the drawing selection process.

Figure 34:
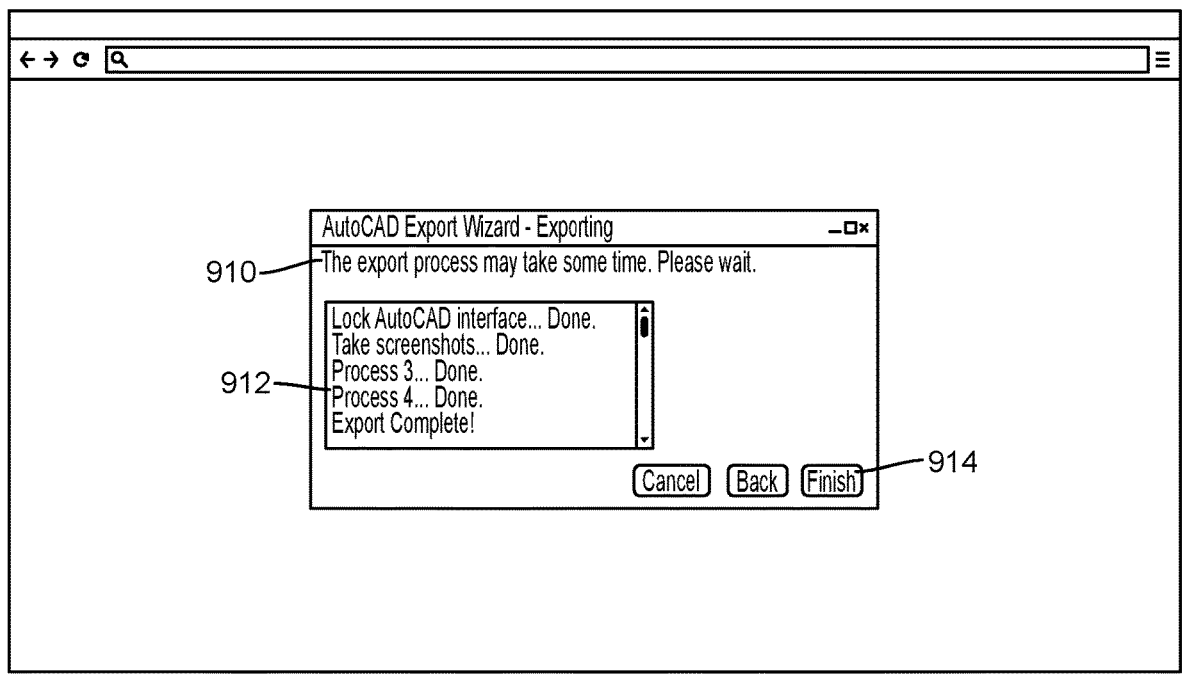
FIG. 34 depicts another illustration of exemplary aspects of the disclosed labor management system.

After the user has confirmed the selection and then selected next, the user will be provided with a pop-up screen 910, as depicted in FIG. 34, which will display the progress of the AutoCAD exporting. As depicted, the user will be provided with the status 912 of the exporting of each drawing. This progress reporting screen will continue to update itself until all the drawings have been successfully uploaded. Once uploaded, the user can select finish 914 to then close out the AutoCAD interface.

After the drawings have been uploaded, the AutoCAD interfaces will be locked so as to prevent movement and de-selection of components. The program will also hide all drawing layers besides those selected. In one aspect, the program will take a screenshot of the selected layers using the AutoCAD image export function. It will then export the selected components to a spreadsheet through the built in AutoCAD export logic. The program will then submit the images spreadsheet file to the labor tracking system for image recognition processing and subsequent use by the labor management system, as described herein.

In an exemplary embodiment, the labor management system for tracking labor on a construction project may include a least one processor configured to obtain drawing data for the construction project from an image scanning processor, obtain estimated labor hours for the construction project, analyze user provided input concerning units installed for the construction project, compare the user provided input concerning units installed with the estimated labor hours, and in response to the comparison, provide a calculation of the percent of labor hours used on the construction project, and thereafter provide an indication of a status of the construction project, including whether the construction project is within the estimated labor hours.

In an exemplary aspect, the labor management system allows the user to provide input concerning units installed through user selection of one or more features on a drawing of the construction project. The user selection of the one or more features on the drawing may be provided by use of a person's finger to select through a user interface the one or more features on the drawing that have been installed on the construction project.

In another exemplary aspect, in response to the calculation of the percent of labor hours used on the construction project, the labor management system may determine the forecasted hours at completion based on the units installed, and may provide a report with the forecasted hours at completion and a report of the labor hours used for the units installed.

In another exemplary aspect, the labor management system and its processor may be configured to obtain cost code data for cost codes for the construction project, and to obtain labor hours used data on the construction project to assign against the cost codes. In response to obtaining the labor hours' data assigned against the cost codes, the labor management system may analyze the labor hours assigned against the cost codes and provide a report thereof.

In another exemplary embodiment, the labor management system may include a method of tracking labor on a construction project through one or more of the steps of providing at least one processor configured to obtain estimated labor hours data for the construction project, entering the estimated labor hours for the construction project, assigning cost codes for the construction project, assigning man power and start dates to the cost codes, assigning management personnel for the construction project, extracting timesheet data for the construction project, calculating from the timesheet data the labor hours used on the construction project, calculating the percentage complete of the construction project, analyzing whether the construction project is within the estimate labor hours, and forecasting whether the construction project will be completed within the estimated labor hours.

In an exemplary aspect, the method may, in response to analyzing whether the construction project is within the estimated labor hours, determine whether to re-forecast the estimated labor hours for the construction project, or it may determine whether to adjust the man power assigned to the construction project. The method may also include the step of generating a report as to whether the construction project will be completed within the estimated labor hours, and assigning against the cost codes the number of labor hours used to install a unit for the construction project. The step of assigning against the cost codes the number of labor hours used to install a unit for the construction project may also include the step of extracting the number of labor hours from the timesheet data. The method may further include the step of entering the re-forecasted estimated labor hours for the construction project. Other and further method steps described herein may be used with the labor management system.

In a further exemplary embodiment of the labor management system, the labor management system may include a non-transitory computer readable medium storing data and computer implementable instructions for carrying out the method for tracking labor on a construction project. This may further include obtaining drawing data for the construction project from an image scanning processor, obtaining estimated labor hours for the construction project, analyzing user provided input concerning units installed for the construction project, comparing the user provided input concerning units installed with the estimated labor hours, in response to the comparing, calculating the percent of labor hours used on the installed units and the construction project, and in response to the calculating, providing an indication of a status of the construction project, including whether the construction project is within the estimated labor hours. This non-transitory computer readable medium storing data and computer implementable instructions for carrying out a method for tracking labor on a construction project may include the user providing input concerning the units installed through the user selecting one or more features on a drawing of the construction project. In an exemplary aspect, in response to the calculating of the percent of labor hours used on the installed units, determining the forecasted hours at completion of the construction project based on the units installed. In a further exemplary aspect, the non-transitory computer readable medium storing data and computer implementable instructions for carrying out a method for tracking labor on a construction project may further include obtaining cost code data for cost codes for the construction project, and assigning against the cost codes the labor hours used to install units for the construction project.

The labor management system disclosed herein provides a highly accurate way to determine where actual field labor hours and associated work complete compare with estimated labor hours for that same volume of work. As indicated above, the labor management system provides real-time reporting to project management whether the field labor hours are tracking with the estimate. The labor management system also serves as a predictor of where the project will finish relative to the estimate and importantly identifies adverse conditions and correlates them to productivity loss early enough so that corrective action can be taken. It does this by calculating the expected (forecasted) hours at completion based on units installed:

$$\text{Forecasted Hours} = \frac{\text{Hours Used}}{\left[\frac{\text{Units Installed}}{\text{Units Estimated}}\right]}.$$

In another aspect, the labor management system disclosed herein provides a tool that determines how many labor hours it should have taken to install portions of the equipment and/or systems. In yet a further aspect, the labor management system links a company's labor estimating productivity factors with actual work installed to deliver a precise measure of how many hours the installation should have taken. Compared with the actual field labor hours used, project management can accurately assess whether the project is on-schedule or off-schedule at any point in time.

The labor management system disclosed herein can be applied to any at-risk construction contractor who relies on its estimates of field labor and therefore has a need to measure actual performance over the course of the entire project. Since most contractors have their own unique way of estimating, the labor management system will be capable of adapting to their method and own estimating factors.

The labor management system disclosed and described herein has numerous practical applications and can be applied to any and all union and merit shop construction contractors who self-perform their work. They will find great value in the labor management system tool. Exemplary users of the labor management system are numerous and include at least the following trades: sheet metal, pipefitters, plumbers, sprinkler fitters, electricians, bricklayers, drywallers, carpenters, low voltage security, operating engineers, plasterers, cement masons, insulators, painters, laborers, roofers, iron workers, stone masons, glazers, and other craftsmen. Still other users of the labor management system disclosed herein will find tremendous value in its use and application.

It is to be understood that the invention is not limited in its application to the details of construction and the arrangement of the components set forth herein and illustrated in the drawings. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention.

What is claimed is:

1. A labor management system for real-time tracking labor on a construction project using computer aided design, the system comprising:
   at least one processor configured to:
   upload an image file with drawing layers for presentation in a mobile application;
   obtain drawings for the construction project;
   identify specific portions for each the drawings by highlighting desired portions of each the drawings;
   capture metadata reflected by the identified specific portions for each of the drawings;
   perform image recognition and mapping of computer aided design coordinates to image pixels of each of the drawings;
   in response to the image recognition and the mapping, permit tracing of the drawings to select features among a plurality of features to update each of the drawings and the construction project;
   update a labor tracking database to reflect installation of the selected features;
   select one or more of the drawing layers and a region of each of the drawings to be exported;
   update a progress reporting screen with an exporting status of each of the drawings until all the drawings have been successfully uploaded;
   hide, in response to the uploading, remaining drawing layers besides the selected one or more drawing layers and lock an interface of the computer aided design to prevent movement and de-selection of the selected features;

image scan processing each of the drawings from an image scanning processor;
obtain drawing data from the image scanning processor, wherein the drawing data includes a total of all features to be installed for a part of the construction project;
obtain estimated labor hours for the construction project;
analyze the selected features that have been installed for the construction project;
obtain user confirmation of the selected features that have been installed;
obtain actual field labor hours used to install the features;
compare the selected features that have been installed with the total of all the features to be installed and compare in real-time with the actual field labor hours used to install the selected features;
in response to a result of both of the comparisons, provide a calculation of a forecasted number of labor hours needed to complete the construction project based on the features installed;
in response to the calculation, provide a comparison of the forecasted number of labor hours needed to complete the construction project with the estimated labor hours for the construction project;
in response to the comparison of the forecasted number of labor hours needed to complete the construction project with the estimated labor hours for the construction project, provide in real-time an indication of a completion status of the construction project, including whether the construction project is within the estimated labor hours; and
in response to the indication of the completion status of the construction, determine whether to adjust the estimated labor hours.

2. The labor management system of claim 1, wherein in response to the calculation of the forecasted number of labor hours, further configuring the at least one processor to provide at least one report with the forecasted number of hours at completion.

3. The labor management system of claim 1, wherein in response to the calculation of the forecasted number of labor hours, further configuring the at least one processor to provide a report of the labor hours currently used for the selected features installed.

4. The labor management system of claim 1, wherein the at least one processor is configured to obtain cost code data for cost codes for the construction project.

5. The labor management system of claim 4, wherein the at least one processor is configured to obtain labor hours used data on the construction project to assign against the cost codes.

6. The labor management system of claim 5, wherein in response to obtaining the labor hours used data assigned against the cost codes, the at least one processor is further configured to analyze the labor hours assigned against the cost codes and provide a report of the labor hours assigned against the cost codes.

7. A non-transitory computer readable medium storing data and computer implementable instructions for carrying out a method for real-time tracking labor on a construction project using computer aided design, the method comprising:
uploading an image file with drawing layers for presentation in a mobile application;
obtaining drawings for the construction project;
identifying specific portions for each the drawings by highlighting desired portions of each the drawings;
capturing metadata reflected by the identified specific portions for each of the drawings;
performing image recognition and mapping of computer aided design coordinates to image pixels of each of the drawings;
in response to the image recognition and the mapping, permitting tracing of the drawings to select features among a plurality of features to update each of the drawings and the construction project;
updating a labor tracking database to reflect installation of the selected features;
selecting one or more of the drawing layers and a region of each of the drawings to be exported;
updating a progress reporting screen with an exporting status of each of the drawings until all the drawings have been successfully uploaded;
hiding, in response to the uploading, remaining drawing layers besides the selected one or more drawing layers and locking an interface of the computer aided design to prevent movement and de-selection of the selected features;
image scan processing each of the drawings from an image scanning processor;
obtaining drawing data from the image scanning processor, wherein the drawing data includes a total of all features to be installed for a part of the construction project;
obtaining estimated labor hours for the construction project;
analyzing the selected features that have been installed for the construction project;
obtaining user confirmation of the selected features that have been installed;
obtaining actual field labor hours used to install the features;
comparing the selected features that have been installed with the total of all the features to be installed and comparing in real-time with the actual field labor hours used to install the selected features;
in response to both of the comparisons, calculating a percent of labor hours used on the installed features and calculating a forecasted number of labor hours needed to complete the construction project based on the features installed;
in response to the calculating, comparing the forecasted number of labor hours needed to complete the construction project with the estimated labor hours for the construction project;
in response to the comparing of the forecasted number of labor hours providing in real-time an indication of a completion status of the construction project, including whether the construction project is within the estimated labor hours; and
in response to the indication of the completion status of the construction, determining whether to adjust the estimated labor hours.

8. The non-transitory computer readable medium storing data and computer implementable instructions for carrying out a method for tracking labor on a construction project of claim 7, further comprising obtaining cost code data for cost codes for the construction project, and assigning against the cost codes the actual labor hours used to install the features for the construction project.

* * * * *